US012551216B2

(12) United States Patent
Chen et al.

(10) Patent No.: US 12,551,216 B2
(45) Date of Patent: Feb. 17, 2026

(54) DOUBLE-BALLOON CATHETER

(71) Applicant: Boston Scientific Scimed, Inc., Maple Grove, MN (US)

(72) Inventors: Yen-i Chen, Montreal (CA); Ali Bessissow, Montreal (CA); Cina Mehrvar, Montreal (CA); Teresa Mihalik, Montreal (CA); Calvin Turland, Verdun (CA); Benoit Thibault, Coteau-du-Lac (CA); André Tremblay, Oka (CA)

(73) Assignee: Boston Scientific Scimed, Inc., Maple Grove, MN (US)

( * ) Notice: Subject to any disclaimer, the term of this patent is extended or adjusted under 35 U.S.C. 154(b) by 152 days.

(21) Appl. No.: 18/694,708

(22) PCT Filed: Sep. 21, 2022

(86) PCT No.: PCT/CA2022/051398
§ 371 (c)(1),
(2) Date: Mar. 22, 2024

(87) PCT Pub. No.: WO2023/044564
PCT Pub. Date: Mar. 30, 2023

(65) Prior Publication Data
US 2024/0398419 A1 Dec. 5, 2024

Related U.S. Application Data

(60) Provisional application No. 63/247,131, filed on Sep. 22, 2021.

(51) Int. Cl.
*A61B 17/12* (2006.01)
*A61M 25/00* (2006.01)
(Continued)

(52) U.S. Cl.
CPC .. *A61B 17/12136* (2013.01); *A61B 17/12045* (2013.01); *A61B 17/12099* (2013.01);
(Continued)

(58) Field of Classification Search
CPC .......... A61B 17/1114; A61B 17/12045; A61B 17/12099; A61B 17/12136;
(Continued)

(56) References Cited

U.S. PATENT DOCUMENTS 5,256,141 A * 10/1993 Gencheff .......... A61M 25/0032
604/501
5,665,063 A * 9/1997 Roth .................... A61F 2/82
604/509

(Continued)

FOREIGN PATENT DOCUMENTS

CN      111840759 A      10/2020
WO    2011053500 A1      5/2011
(Continued)

OTHER PUBLICATIONS

International Search Report for PCT/CA2022/051298 dated Sep. 21, 2022.

*Primary Examiner* — Ryan J. Severson
(74) *Attorney, Agent, or Firm* — Seager, Tufte & Wickhem, LLP

(57) ABSTRACT

A double-balloon multi-lumen catheter is disclosed. The catheter comprises an elongate catheter body including a plurality of lumens. The catheter also includes a plurality of occlusion balloons connected to one or more lumens, and one or more entry ports associated with the plurality of lumens. The catheter also includes an attachable catheter hub comprising a plurality of entry ports. The catheter hub is arranged to receive a proximal end of the elongate catheter body and fluidly connect one or more of the plurality of
(Continued)

lumens to associated one of more of the plurality of entry ports. The entire length of the catheter body is configured to pass through the working channel of a gastrointestinal endoscope. The catheter hub is configured to be attached to the proximal end of the elongate catheter body allowing endoscope removal from the catheter body without disrupting the balloon position.

22 Claims, 15 Drawing Sheets

(51) Int. Cl.
*A61B 17/00* (2006.01)
*A61M 27/00* (2006.01)

(52) U.S. Cl.
CPC ...... *A61M 25/003* (2013.01); *A61M 25/0097* (2013.01); *A61B 2017/00818* (2013.01); *A61B 2017/1205* (2013.01); *A61M 27/002* (2013.01)

(58) Field of Classification Search
CPC .. A61B 2017/00818; A61B 2017/1205; A61B 2017/1139; A61M 25/003; A61M 25/0097; A61M 25/1011; A61M 27/002; A61F 2/90; A61F 2002/045
See application file for complete search history.

(56) References Cited

U.S. PATENT DOCUMENTS

| | | | |
|---|---|---|---|
| 5,779,673 A * | 7/1998 | Roth | A61M 25/1011 604/509 |
| 5,817,046 A * | 10/1998 | Glickman | A61M 25/1011 604/6.11 |
| 5,908,407 A * | 6/1999 | Frazee | A61M 25/1011 604/101.02 |
| 5,919,163 A * | 7/1999 | Glickman | A61M 1/3615 604/101.05 |
| 7,303,571 B2 * | 12/2007 | Makower | A61B 17/12186 606/158 |
| 7,329,237 B2 * | 2/2008 | Yokoyama | A61M 25/1011 604/101.01 |
| 7,347,853 B2 * | 3/2008 | DiFiore | A61M 39/0606 604/537 |
| 7,381,204 B2 * | 6/2008 | Wilson | A61M 1/3659 128/898 |
| 7,914,513 B2 * | 3/2011 | Voorhees, Jr. | A61M 1/3661 604/500 |
| 8,262,611 B2 * | 9/2012 | Teeslink | A61M 25/1011 604/101.03 |
| 8,435,218 B2 * | 5/2013 | Hinchliffe | B82Y 10/00 604/247 |
| 8,858,584 B2 * | 10/2014 | Hartley | A61B 17/12136 604/101.05 |
| 9,924,948 B2 * | 3/2018 | Burnett | A61B 17/1219 |
| 10,952,733 B2 * | 3/2021 | Baron | A61B 17/1114 |
| 11,071,557 B2 * | 7/2021 | Lawinger | A61B 17/2202 |
| 11,471,654 B2 * | 10/2022 | Raijman | A61M 25/04 |
| 11,547,837 B2 * | 1/2023 | Zou | A61B 17/12045 |
| 11,617,543 B2 * | 4/2023 | McKinney | A61B 5/036 600/561 |
| 12,005,206 B2 * | 6/2024 | Wang | A61P 31/00 |
| 2001/0041862 A1 * | 11/2001 | Glickman | A61M 1/3615 604/101.03 |
| 2003/0088213 A1 | 5/2003 | Schweikert et al. | |
| 2004/0064091 A1 * | 4/2004 | Keren | A61B 17/12036 600/16 |
| 2004/0065333 A1 | 4/2004 | Wilson et al. | |
| 2004/0098030 A1 * | 5/2004 | Makower | A61B 17/12159 606/200 |
| 2005/0159703 A1 * | 7/2005 | Yokoyama | A61M 25/1011 604/101.03 |
| 2005/0256461 A1 | 11/2005 | DiFiore et al. | |
| 2005/0261665 A1 | 11/2005 | Voorhees | |
| 2008/0132937 A1 * | 6/2008 | Hartley | A61B 17/12109 604/101.03 |
| 2009/0216262 A1 * | 8/2009 | Burnett | A61B 17/12022 606/192 |
| 2011/0118546 A1 | 5/2011 | Dillon et al. | |
| 2011/0130778 A1 * | 6/2011 | Hinchliffe | A61B 17/22032 606/159 |
| 2011/0172491 A1 | 7/2011 | Piskun et al. | |
| 2012/0016294 A1 | 1/2012 | Teeslink et al. | |
| 2013/0345628 A1 * | 12/2013 | Berger | A61M 25/10 604/101.05 |
| 2019/0117242 A1 * | 4/2019 | Lawinger | A61B 18/26 |
| 2019/0366059 A1 * | 12/2019 | Raijman | A61M 29/02 |
| 2020/0187946 A1 | 6/2020 | Baron et al. | |
| 2020/0276420 A1 * | 9/2020 | Zou | A61M 25/0662 |
| 2021/0196202 A1 * | 7/2021 | McKinney | A61B 5/036 |
| 2023/0310812 A1 * | 10/2023 | Zambetti | A61M 25/0075 604/509 |
| 2024/0398419 A1 * | 12/2024 | Chen | A61M 25/0097 |

FOREIGN PATENT DOCUMENTS

| | | |
|---|---|---|
| WO | 2020072467 A1 | 4/2020 |
| WO | 2022051486 A1 | 3/2022 |

* cited by examiner

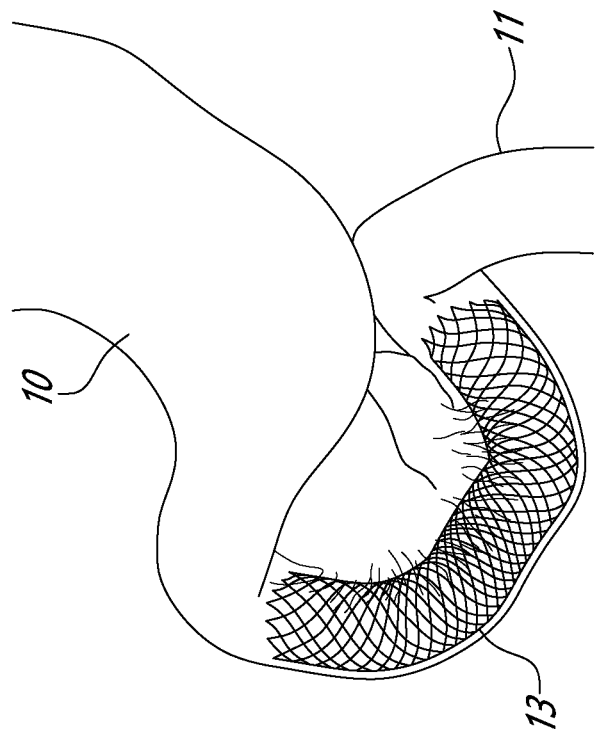
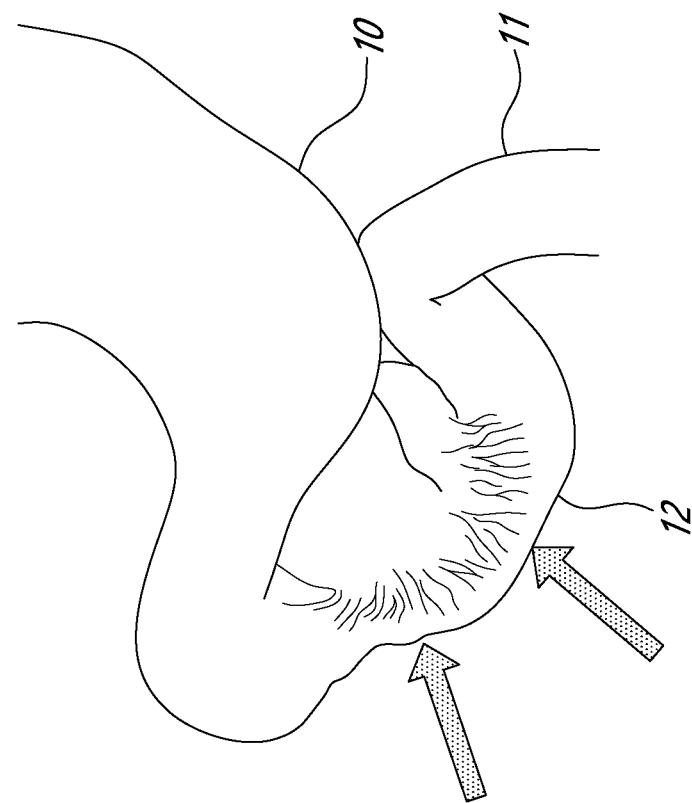
FIG. 1A
FIG. 1B (PRIOR ART)

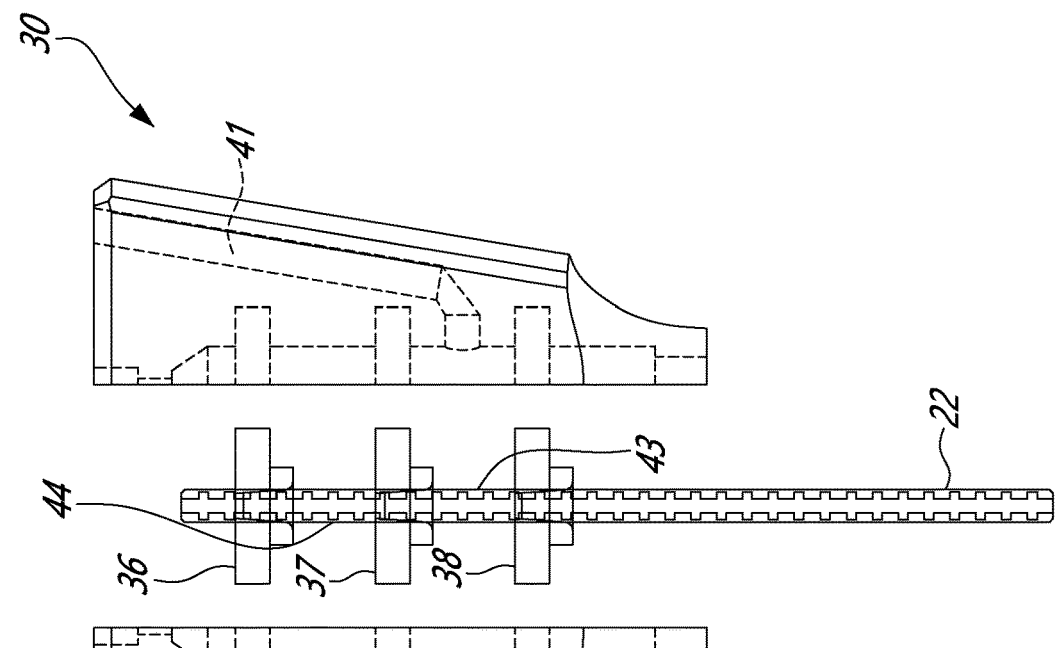
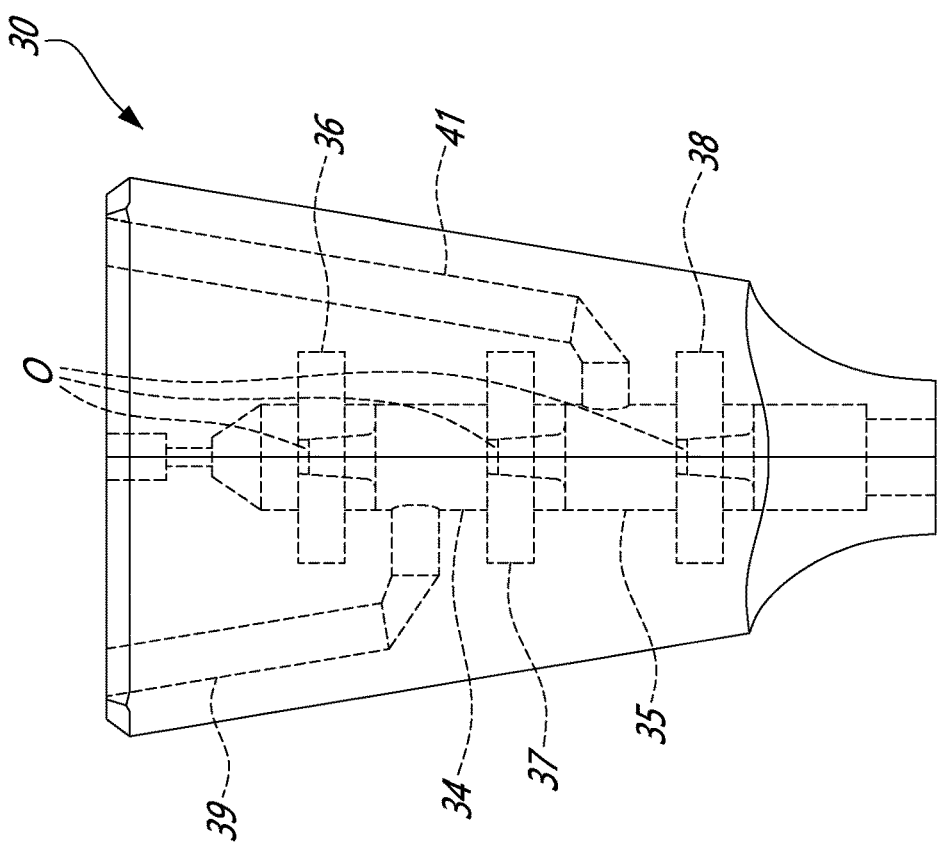
FIG. 6B
FIG. 6A

DOUBLE-BALLOON CATHETER

CROSS-REFERENCE TO PREVIOUS APPLICATION

This application claims priority from U.S. provisional patent application No. 63/247,131 filed on Sep. 22, 2021, which is incorporated herein by reference in its entirety.

FIELD

The present disclosure relates to the field of medical devices used in surgical procedures. In particular, the present disclosure relates to catheters having occlusion balloons.

Introduction

Gastric outlet obstruction (GOO) is a medical condition in which an obstruction develops around the pylorus (i.e., the outlet of the stomach) and duodenum (i.e., the inlet of the small intestine). This condition causes emesis (i.e., vomiting) of accumulated stomach contents that cannot pass into the small intestine because of the obstruction. Such obstructions can be caused by a variety of conditions, including peptic ulcer disease and gastric cancer.

Prior art methods of managing GOO include delivering a duodenal stent through the working channel of an endoscope over a guidewire. Common disadvantages associated with such methods include a high incidence of tissue ingrowth and overgrowth, which often requires multiple follow-up interventions to address.

In order to address the problems associated with duodenal stents, other prior art methods of treating GOO have been developed. One promising method is known as endoscopic ultrasound guided gastroenterostomy (EUS-GE), during which a portion of the small intestine is distended by rapidly infusing within it a large volume of water and using distention of the small intestine to deliver a lumen apposing metal stent (LAMS) to fluidly connect the stomach to the small intestine. Problems associated with this solution include suboptimal distention of the small intestine leading to stent mis-deployment and gastrointestinal perforation, reflux of fluid leading to aspiration pneumonia, and cardiovascular complications. Moreover, during such procedures, it can be difficult to locate the small intestine, increasing the risk of mis-puncture and inadvertently forming a connection between the stomach and the colon instead of the stomach and the small intestine.

In order to mitigate the problems associated with EUS-GE methods, the endoscopic ultrasound guided balloon-occluded gastrojejunostomy bypass procedure was developed. This procedure uses a modified nasogastric tube having a media infusion port between the two balloons, which tube is delivered to the small intestine over a guidewire. The occlusion balloons are then filled with a fluid and the space between the occlusion balloons is infused with a fluid in order to distend a portion of the small intestine, ultimately assisting with LAMS insertion and deployment. This procedure has not gained widespread adoption because it can be very difficult to deliver the tube to the small intestine over a guidewire. Some operators have resorted to the use of an overtube (e.g., a splinting tube) to help deliver the double-balloon tube to the desired location, which further complicates the procedure.

There is therefore a clear need for a device which can facilitate the deployment of various catheters in the human body during surgical procedures.

Features that distinguish the present invention from the background art will be apparent from review of the disclosure, drawings and description of the invention presented below.

SUMMARY

The following summary is intended to introduce the reader to various aspects of the applicant's teaching, but not to define any invention.

The various embodiments described herein generally relate to double-balloon catheters with attachable catheter hubs. In some embodiments, the catheter hubs are both attachable and detachable.

In one aspect of the present disclosure, there is provided a double-balloon catheter that comprises an elongate catheter body including a plurality of lumens. The double-balloon catheter further comprises a first and second inflatable occlusion balloons located proximate a distal end of the elongate catheter body. The first and second inflatable occlusion balloons are configured to receive fluid through at least one of the plurality of lumens. The double-balloon catheter further comprises an infusion port located proximate the distal end of the elongated catheter body. The infusion port is in fluid communication with another of the plurality of lumens and situated between the first inflatable occlusion balloon and the second inflatable occlusion balloon. The double-balloon catheter also comprises a catheter hub having a plurality of entry ports. The catheter hub is arranged to be attachable to a proximal end of the elongate catheter body. The catheter hub is also arranged to fluidly connect two or more of the plurality of lumens to associated one or more of the plurality of entry ports. The entire length of the elongate catheter body is configured to pass through the working channel of a gastrointestinal endoscope.

According to some embodiments, the catheter hub is further arranged to be detachable from the proximal end of the elongate catheter body.

According to some embodiments, the cross-section of the portion of the elongate catheter body that is connected to the catheter hub is of substantially the same diameter as the rest of the elongate catheter body.

According to some embodiments, the first and second occlusion balloons are both fluidly connected to one of the two or more of the plurality of lumens.

According to some embodiments, the first and second occlusion balloons are each connected to separate one of the two or more of the plurality of lumens.

According to some embodiments, the double-balloon catheter further comprises a second infusion port located between the first and second occlusion balloons and the proximal end of elongate catheter body.

According to some embodiments, the double-balloon catheter of further comprises a second infusion port located between the first and second occlusion balloons and the distal end of elongate catheter body.

According to some embodiments, the double-balloon catheter further comprises a lumen suitable for advancing a guidewire therethrough.

According to some embodiments, the catheter hub is further arranged to receive a portion of the proximal end of the elongate catheter body.

According to some embodiments, the plurality of lumens each include lumen sidewalls and fluid communication between the plurality of lumens and the catheter hub is provided by openings in the lumen sidewalls of the two or more of the plurality of lumens.

According to some embodiments, the openings are disposed at different longitudinal locations along the length of the proximal end of the elongate catheter body.

According to some embodiments, the catheter hub is further arranged to receive a portion of the proximal end of the elongate catheter body along an insertion axis.

According to some embodiments, the catheter hub further comprises a plurality of chambers longitudinally disposed along the insertion axis, wherein each chamber is fluidly connected to an entry port, and wherein the plurality of lumens includes one or more lumens associated with each chamber. When the proximal end of the elongate catheter body is fully received into the catheter hub along the insertion axis, each of the one or more lumens is arranged such that its lumen opening is positioned inside its associated chamber.

According to some embodiments, the plurality of chambers are separated by seals configured to fluidly seal the chambers from one another when the elongate catheter body is received through the seals.

According to some embodiments, the seals are made of elastic material, such as latex, silicone, including gel-filled and/or intact-gel silicone structures or soft acrylic polymer.

According to some embodiments, the chambers comprise cage structure longitudinally extending along the insertion axis from a top end to a bottom end. The top and bottom ends are separated by at least one structure allowing the elongate catheter body to be received through the top and bottom ends and allowing fluid to flow through the volume created by the cage structure. According to some embodiments, the chambers and seals are made of a monolithic piece of molded material.

According to some embodiments, the first inflatable occlusion balloon and the second inflatable occlusion balloon have a length of 32 mm to 50 mm and a height of 32 mm to 50 mm.

According to some embodiments, at least one of the plurality of lumens is configured to carry gas therethrough.

According to some embodiments, the double-balloon catheter further comprises a securing mechanism configured to secure the proximal end of the elongate catheter body in place when fully inserted into the catheter hub.

According to some embodiments, the securing mechanism comprises an annular flange or rib formed around a portion of the proximal end of the elongate catheter body and configured to be inserted into a corresponding recess in the catheter hub.

According to some embodiments, the double-balloon catheter further comprises a disposable sheath configured to facilitate insertion of the proximal end of the elongate catheter body through the seals.

DRAWINGS

The drawings included herewith are for illustrating various examples of apparatus and processes of the present specification and are not intended to limit the scope of what is taught in any way. In the drawings:

FIG. 1A shows a stomach and a portion of a small intestine having a gastric outlet obstruction (GOO);

FIG. 1B shows a stomach and a portion of a small intestine in which a duodenal stent has been delivered to the duodenum in accordance with the prior art;

FIG. 6A shows the internal configuration of the catheter hub of a catheter in accordance with embodiments of the present disclosure;

FIG. 6B shows an exploded view of the internal configuration of the catheter hub of a catheter in accordance with embodiments of the present disclosure;

Figure 7C:
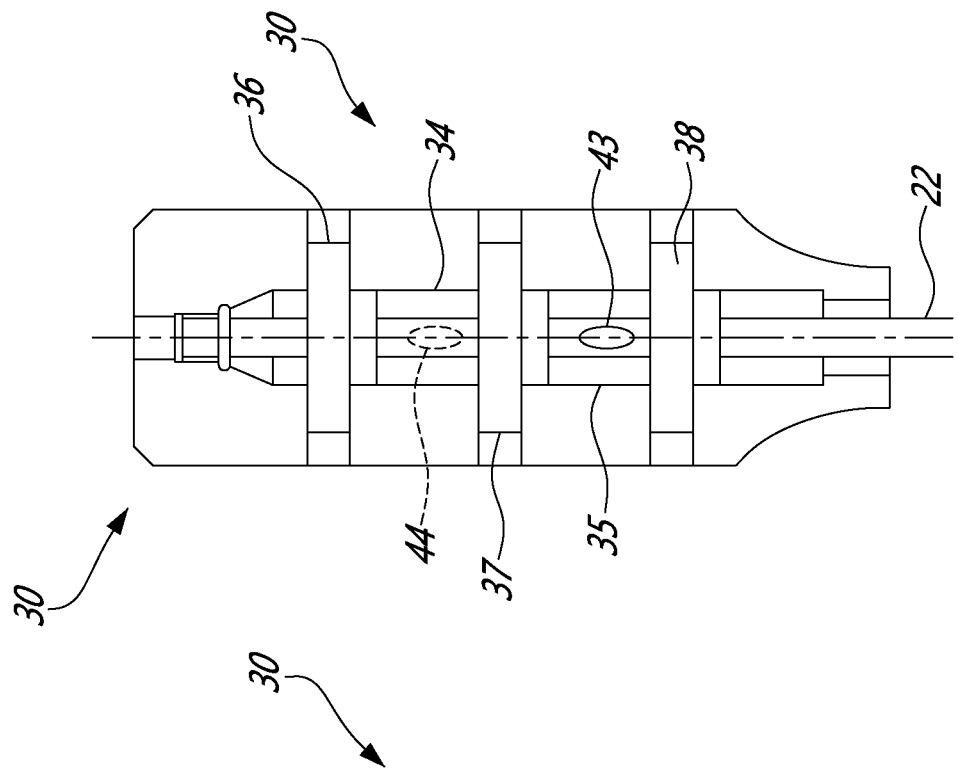
Figure 7B:
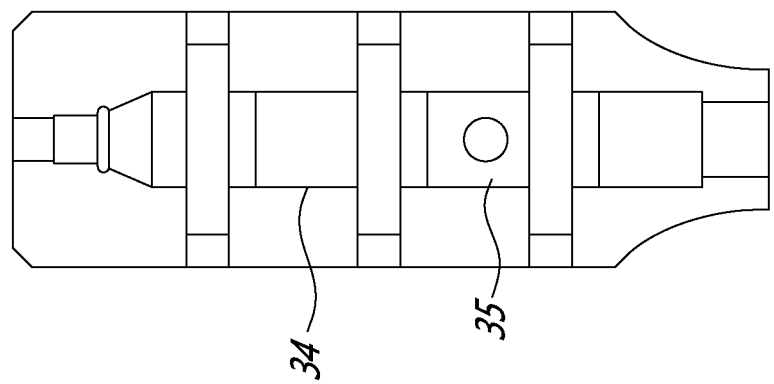
Figure 7A:
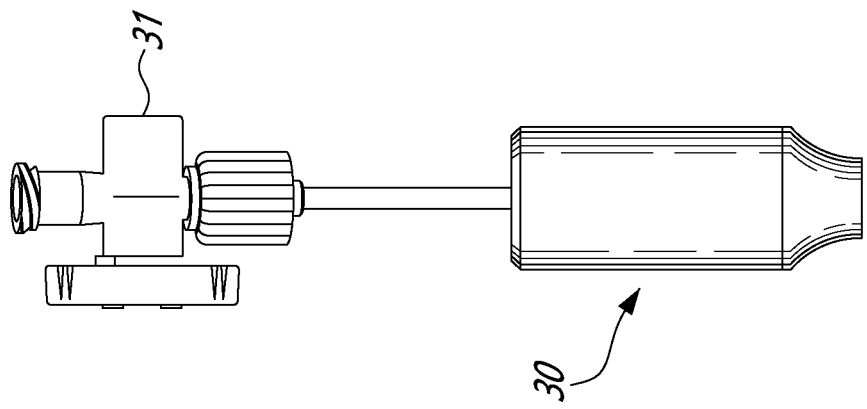
Figure 8:
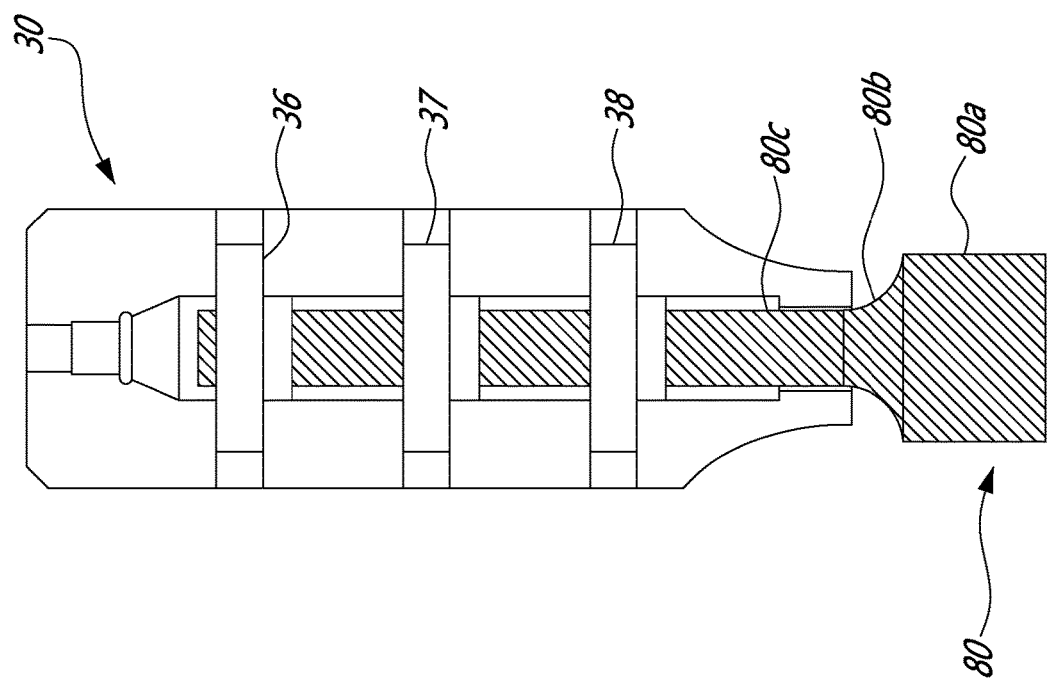
Figure 9B:
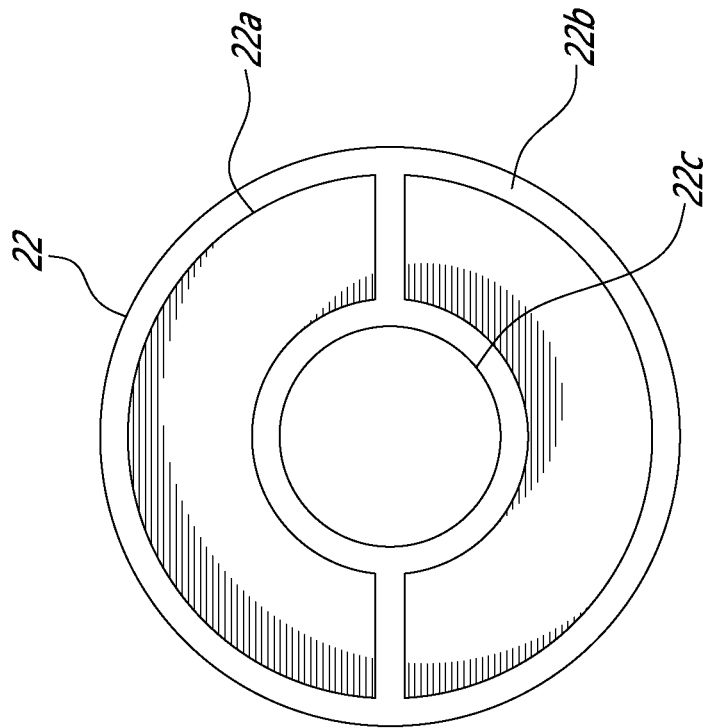
Figure 9A:
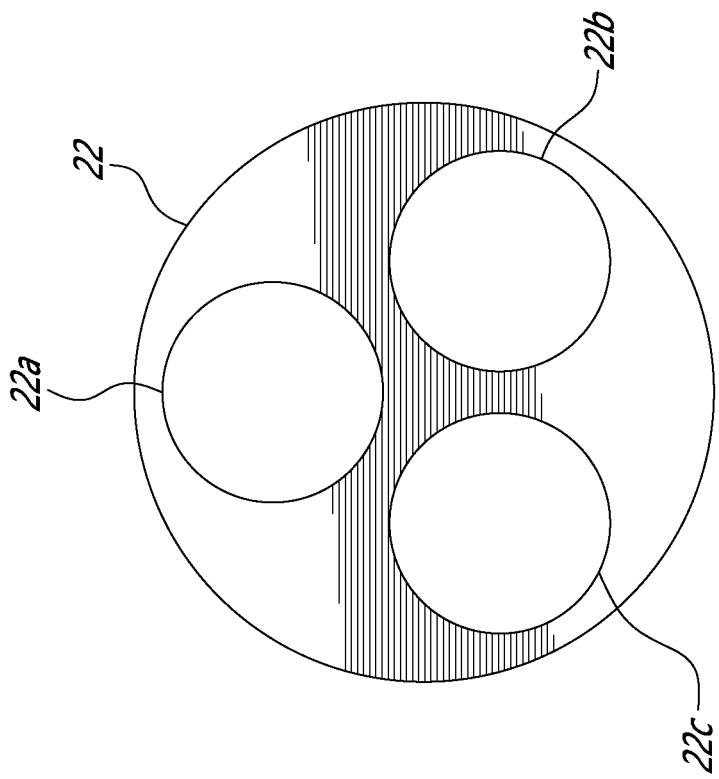
Figure 10A:
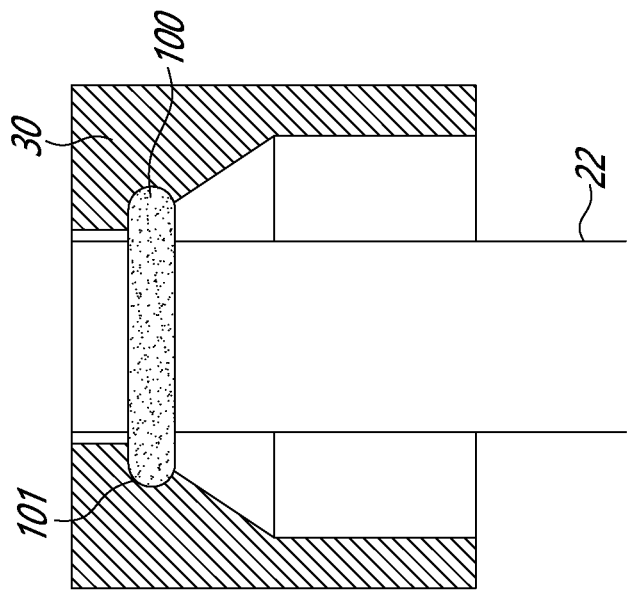
Figure 10B:
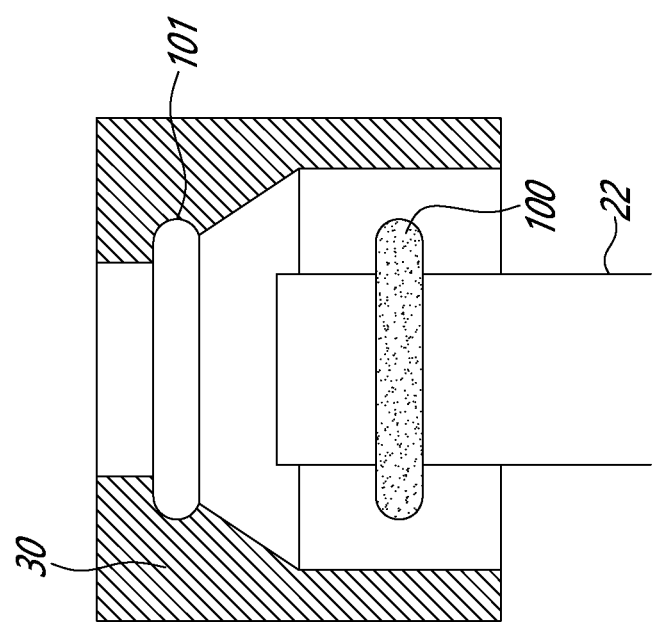
Figure 11:
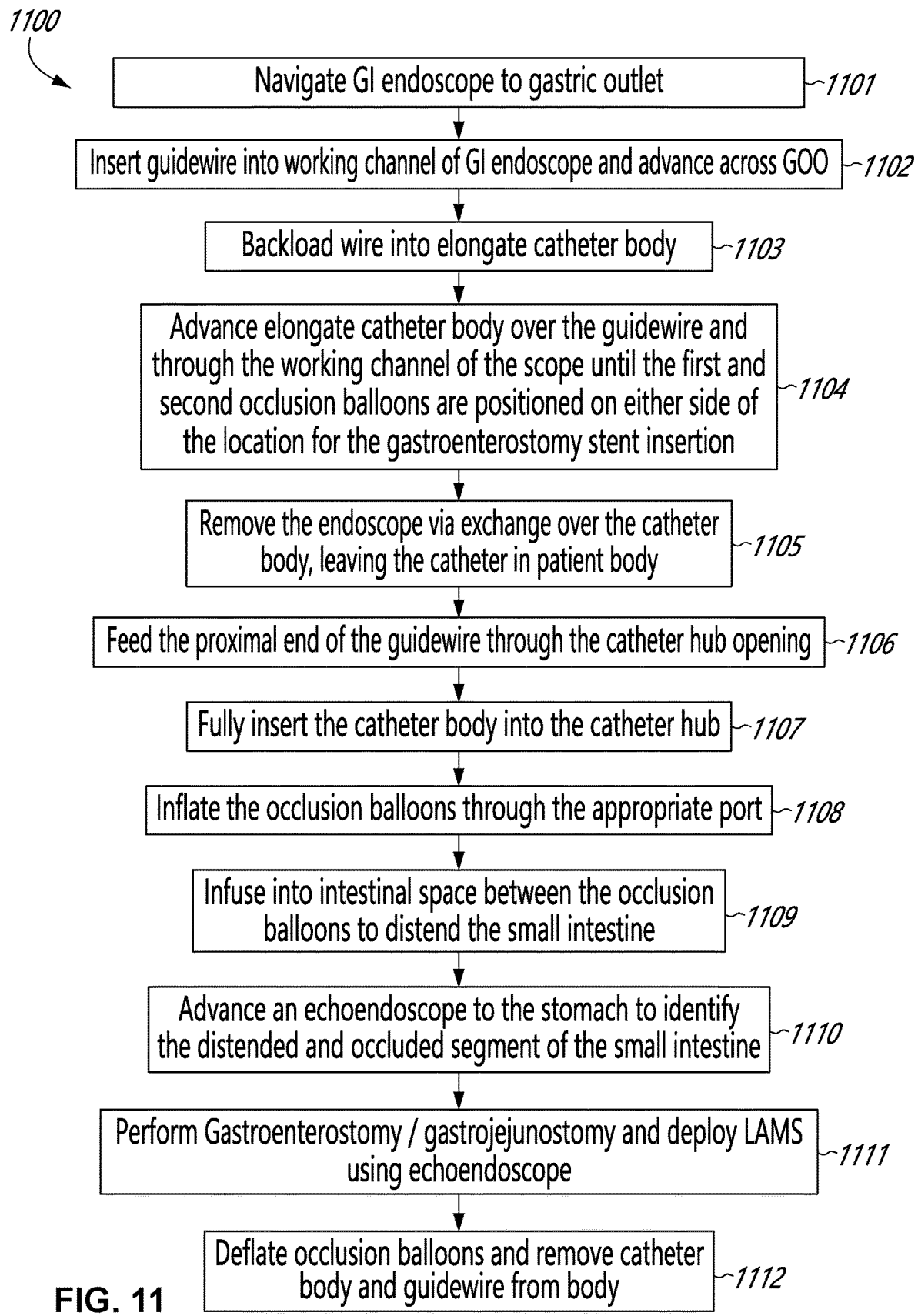
Figure 12:
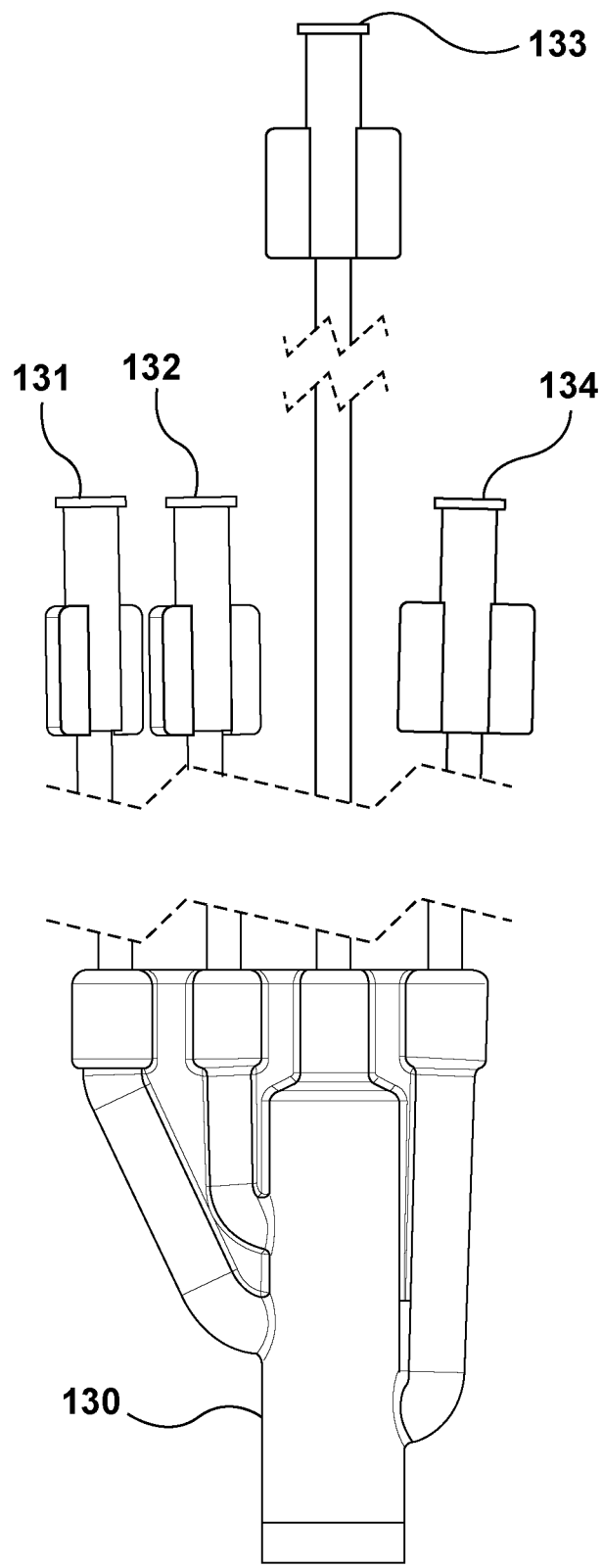
Figure 13:
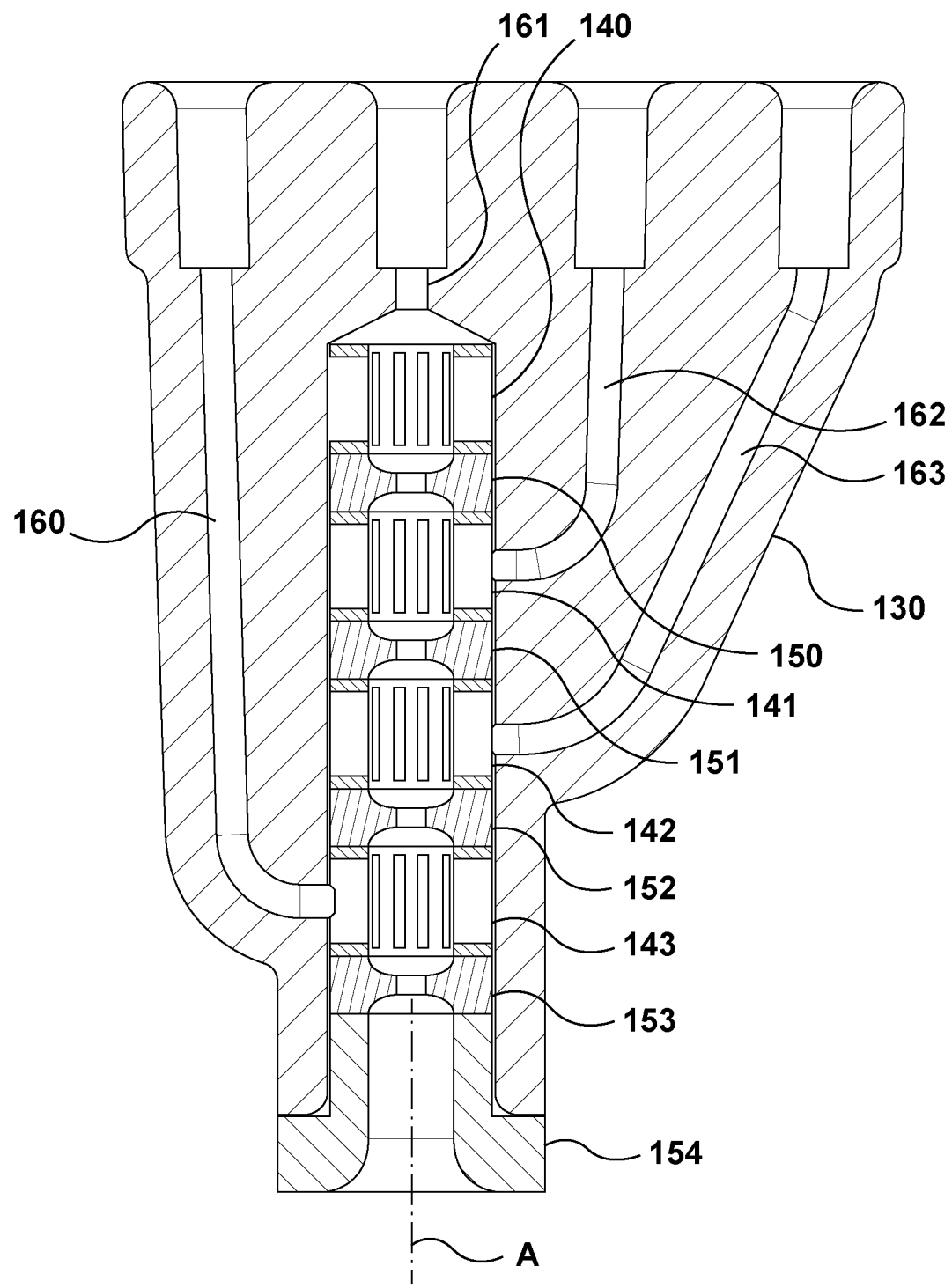
Figure 14:
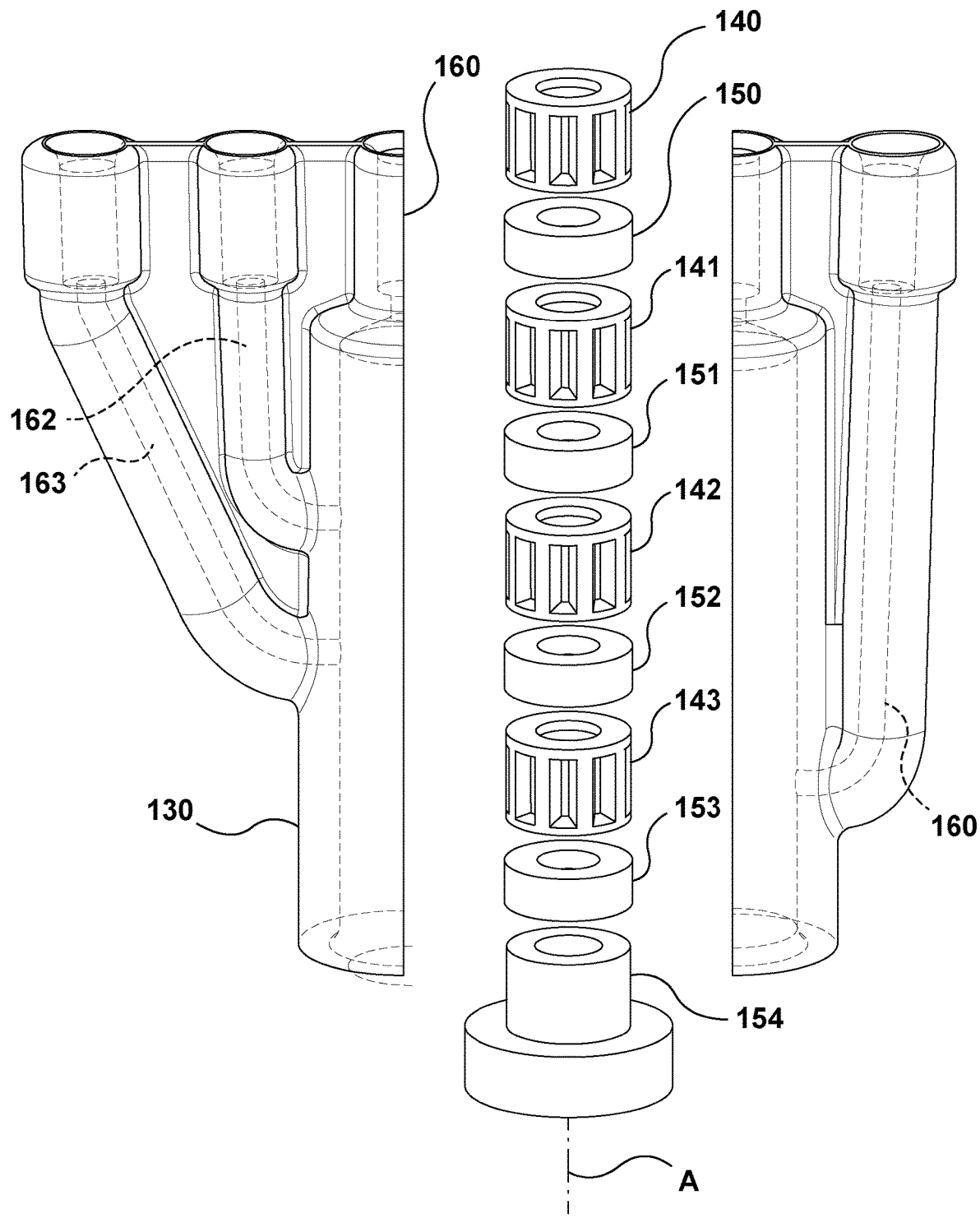
Figure 15:
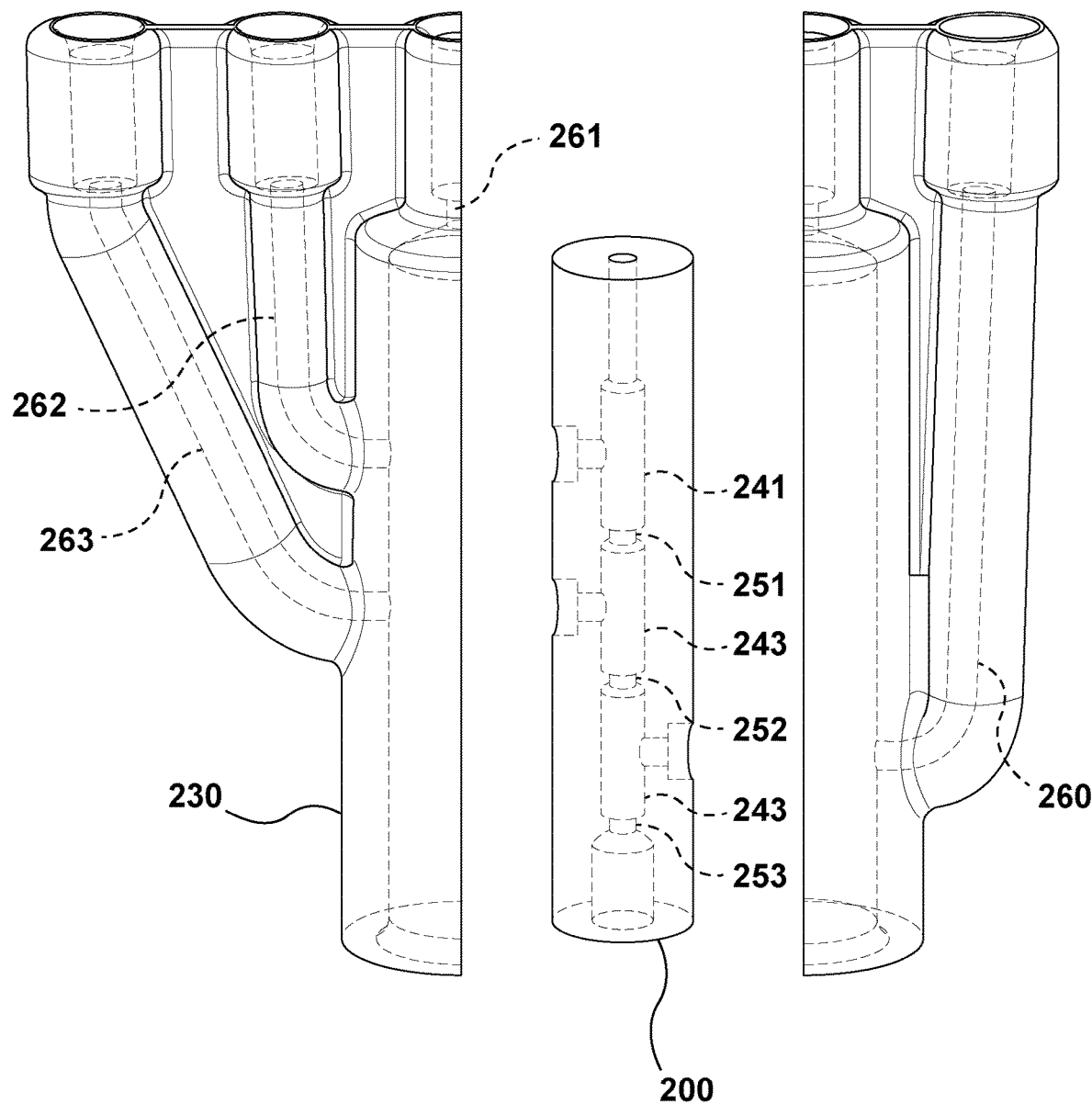

FIGS. 7A-C show various side views of the ports and catheter hub of a catheter in accordance with embodiments of the present disclosure;

FIG. 8 shows a side view of a catheter hub and catheter body introducer in accordance with embodiments of the present disclosure;

FIGS. 9A and 9B show different cross-sectional views of the catheter body in accordance with different embodiments of the present disclosure;

FIGS. 10A and 10B show a securing mechanism that can form part of a catheter in accordance with embodiments of the present disclosure;

FIG. 11 shows a flow chart of the steps involved in an endoscopic ultrasound guided balloon-occluded gastrojejunostomy bypass procedure using a catheter in accordance with embodiments of the present disclosure;

FIG. 12 shows a catheter hub in accordance other embodiments of the present disclosure;

FIG. 13 shows the internal configuration of the catheter hub of a catheter in accordance with embodiments of FIG. 12;

FIG. 14 shows an exploded view of the internal configuration of the catheter hub of a catheter in accordance with embodiments of FIGS. 13 and 14; and FIG. 15 shows a catheter hub in accordance with yet other embodiments of the present disclosure.

Further details of the device disclosed herein, and its advantages, will be apparent from the detailed description included below.

DESCRIPTION OF VARIOUS EMBODIMENTS

Various apparatus and methods will be described below to provide an example of an embodiment of each claimed invention. No embodiment described below limits any claimed invention and any claimed invention may cover apparatus or methods that differ from those described below. The claimed inventions are not limited to apparatus or methods having all of the features of any one apparatus or method described below or to features common to multiple or all of the apparatus or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicants, inventors, or owners do not intend to abandon, disclaim, or dedicate to the public any such invention by its disclosure in this document.

As used herein, the terms "small intestine" or "small bowel" is defined as an organ in the gastrointestinal tract comprising the duodenum, the jejunum and the ileum.

As used herein, the term "fluid" is defined as any liquid or gas or generally any material that cannot sustain a shearing force when at rest and that undergoes a continuous change in shape when subjected to such a stress.

As used herein, the term "infusion" is defined as the continuous introduction of a fluid into a space.

As used herein, the term "inflation" is defined as the continuous introduction of a fluid into a space defined by the interior of an inflatable object.

FIG. 1A a stomach 10 and a portion of a small intestine 11 having a gastric outlet obstruction (GOO) 12. As can be seen from FIG. 1A, a gastric outlet obstruction is a blockage of the portion of the small intestine that connects to the stomach, which can prohibit the passage of food therethrough. This section of the small intestine, also known as the duodenum, the proximal intestine, or the anterior intestine, is a hollow tube between 25 and 38 centimeters long that connects the stomach to the second part of the small intestine (also known as the jejunum).

If left untreated, GOO can progress to a point at which digestion of food is negatively impacted or entirely prohibited. GOO is caused by pressure on the duodenum (as shown by the arrows in FIG. 1A). This pressure can be caused by a number of conditions, including but not limited to, swelling from peptic ulcers, swelling from the pancreas, scar tissue from a peptic ulcer or a cancer growth.

FIG. 1B shows a stomach 10 and a portion of a small intestine 11 in which a duodenal stent 13 has been delivered to the duodenum 12 in accordance with the prior art. This prior art technique includes the step of delivering a duodenal stent through the working channel of an endoscope over a guidewire. Common disadvantages associated with such methods include a high incidence of tissue ingrowth and overgrowth, which often require multiple follow-up interventions to address. Other complications associated with this technique include perforation of the duodenum, migration of the stent further into the small intestine, bleeding, ulceration, food impaction, and further obstruction.

In order to address the disadvantages associated with the duodenal stenting techniques, a technique known as endoscopic ultrasound guided gastroenterostomy (EUS-GE) was developed. This prior art technique includes the steps of, using an endoscope, distending the small intestine by rapidly infusing it with a large volume of water through the endoscope and using the resulting pressure to deliver a lumen apposing metal stent (LAMS) to the stomach.

LAMS stents typically comprise a short lumen having flanged ends. LAMS are used for a number of reasons, including but not limited to, the drainage of intra-abdominal fluid collections, decompression of obstructed ductal systems, or the creation of fistulous tracts between organs. In addressing GOO, LAMS 24 can be used to create a fistulous tract between the stomach 10 and the small intestine 11, allowing stomach contents to effectively bypass any obstruction in the duodenum.

In order to place the LAMS 24, the wall of the stomach 10 and the wall of the small intestine 11 must be punctured using the cautery tip of a LAMS delivery catheter and the stent 13 must be deployed at an appropriate position through the small intestine 11 and stomach 10. The dual-flanged shape of the LAMS 24 helps keep the perforated wall of the stomach 10 in close proximity with the perforated wall of the small intestine 11, thereby minimizing the potential for leakage.

As set out elsewhere herein, problems associated with the direct infusion of fluid using an endoscope include suboptimal distension of the small intestine 11 leading to stent mis-deployment and gastrointestinal perforation, reflux of fluid leading to aspiration pneumonia, and cardiovascular complications. Moreover, during such procedures, it can be difficult to locate the small intestine 11, increasing the risk of mis-puncture and inadvertently forming a connection between the stomach 10 and the colon (not shown) instead of the stomach 10 and the small intestine 11.

In order to mitigate these problems, nasogastric tubes have been modified that use inflatable balloons to occlude the area surrounding the point at which the wall of the small intestine 11 is to be punctured in order to optimize small intestine distension and reduce the amount of fluid required to distend the small intestine 11 so as to push its wall closer to the wall of the stomach 10. This procedure, known as an endoscopic ultrasound guided balloon-occluded gastrojejunostomy bypass, uses a double-balloon tube that includes a first inflatable balloon, a second inflatable balloon and a media infusion port therebetween.

Current endoscopic ultrasound guided balloon-occluded gastrojejunostomy bypass procedures using modified nasogastric tubes having occlusion balloons typically involve the following steps.

Using the working channel of an endoscope, a guidewire is first delivered, through the stomach 10, past the GOO 12, to the small intestine 11. Then, the endoscope is removed, and the guidewire is left in place. The modified nasogastric tube is then advanced to the small intestine 11 over the guidewire. Once in position in the small intestine 11, both balloons are filled with a fluid (typically a saline solution), thereby occluding the small intestine 11 around the site at which the LAMS is to be delivered. The space of the small intestine 11 between the balloons is then filled with a fluid to locally distend the small intestine 11. By locally distending the small intestine 11, the wall of the small intestine 11 is brought into proximity to the wall of the stomach 10, thereby facilitating puncture of these walls and deployment of the LAMS 24.

One significant problem with this method is that it can be very difficult to deliver the modified nasogastric tube to the small intestine 11 via the guidewire, given the GOO and the circuitous route between the stomach 10 and the small intestine 11, as well as the propensity of the modified nasogastric tube to buckle and fold inside the stomach. For this reason, some operators have resorted to the use of an overtube (e.g., a splinting tube) to help deliver the double-balloon tube to the desired location, which further complicates the procedure.

Figure 2:
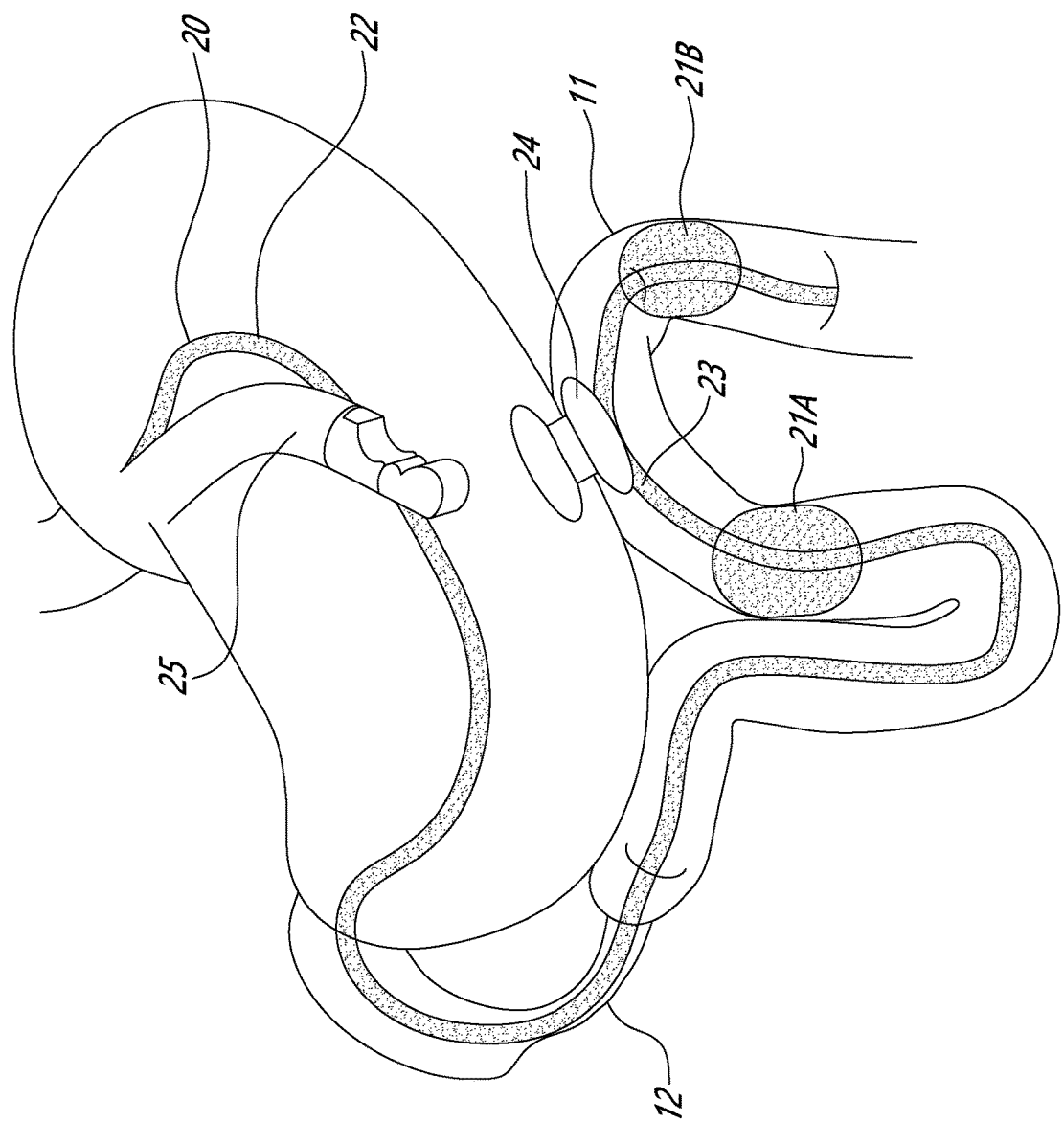
FIG. 2 shows a stomach and a portion of the small intestine during a balloon-occluded gastrojejunostomy bypass procedure using a device in accordance with an embodiment of the present disclosure.

FIG. 2 shows a stomach 10 and a portion of the small intestine 11 during a balloon-occluded gastrojejunostomy bypass procedure using a catheter 20 in accordance with an embodiment of the present disclosure. The catheter 20, which is shown fully deployed in FIG. 2, includes an elongate catheter body 22 comprising a plurality of lumens connected to a first balloon 21a, a second balloon 21b and an infusion port 23. In some embodiments, one lumen can be used to pass a guidewire therethrough. FIG. 2 also shows a LAMS 24 that has been deployed, as well as an echoendoscope 25, which is used to deploy the LAMS 24. The technique of balloon-occluded gastrojejunostomy bypass using a catheter 20 in accordance with an embodiment of the present disclosure is set out in detail elsewhere herein, with reference to FIG. 11.

The catheter disclosed herein comprises an elongate catheter body including a plurality of lumens. The catheter also comprises one or more entry ports associated with the plurality of lumens. The catheter disclosed herein also comprises a catheter hub that comprises a plurality of entry ports. The catheter hub is arranged to receive a proximal end of the elongate catheter body and fluidly connect one or more of the plurality of lumens to associated one of more of the plurality of entry ports. The catheter hub 30 is configured to be detached and reattached to the proximal end of the elongate catheter body and the entire length of the catheter body is configured to pass through the working channel of an endoscope.

Figure 3:
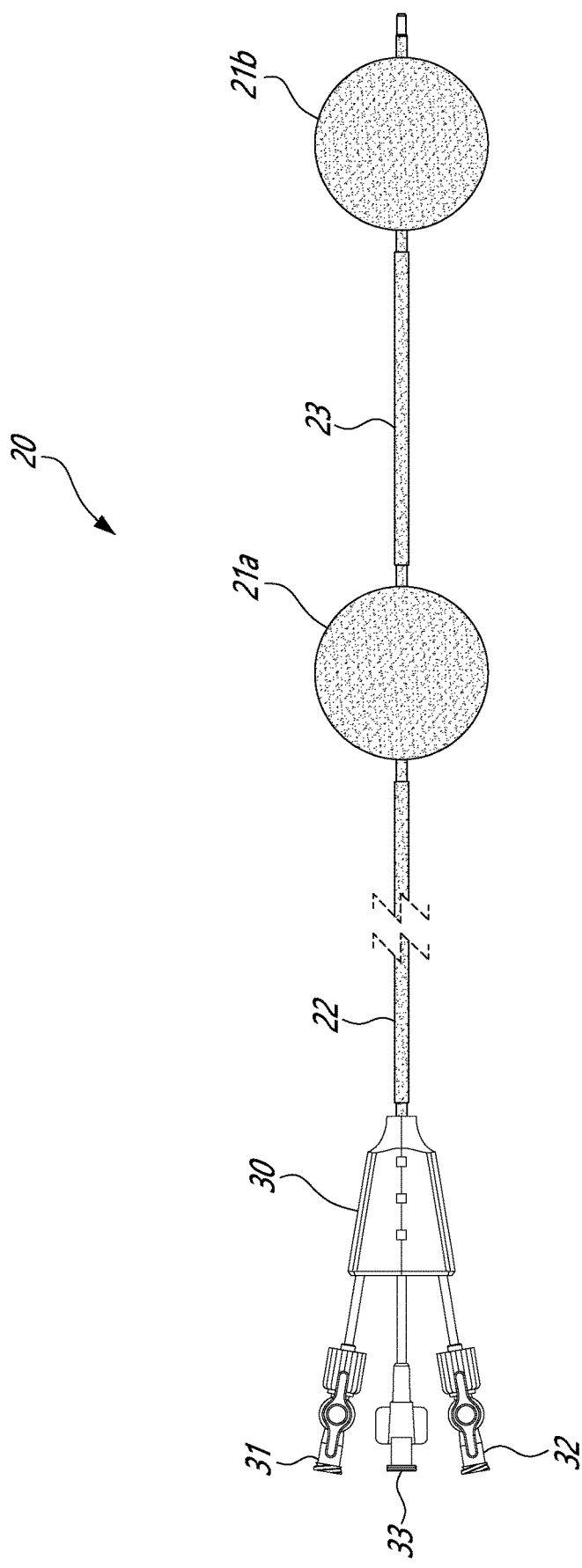
FIG. 3 shows a catheter in accordance with embodiments of the present disclosure.

FIG. 3 shows another view of a catheter 20 in accordance with embodiments of the present disclosure. The catheter 20 includes a catheter hub 30, having a plurality of ports 31, 32 and 33, an elongate catheter body 22 comprising a plurality of lumens connected to a first balloon 21a, a second balloon 21b and an infusion port 23. In some embodiments, the catheter 20 in accordance with the present disclosure can include more than two occlusion balloons.

The catheter body 22 comprises a plurality of lumens suitable for various purposes. The catheter body 22 can be of any length and diameter suitable to allow the entire length of the catheter body 22 to pass through the working channel of known gastrointestinal endoscopes. In some embodiments, the catheter body 22 is preferably 3.3 mm (i.e., 10 French Gauge), or less, in diameter, so that it can be passed through the working channel of several gastrointestinal endoscopes available on the market. In some embodiments, the catheter body 22 is 200-230 cm in length, so that it can be passed through the working channel of several gastrointestinal endoscopes available on the market. As will be appreciated, the device disclosed herein may be of any diameter suitable for insertion through the working channel of an endoscope, and particularly with endoscopes having relatively small (e.g., 2.4 mm to 4.4 mm) working channel diameters.

The catheter body 22 can be made of any suitable material, including but not limited to polymers such as silicone rubber, nylon, polyurethane, polyethylene, polyethylene terephthalate (PET), latex, and thermoplastic elastomers. Preferably, the catheter body 22 is made of Pebax®, a thermoplastic elastomer. Pebax® has suitable stiffness and an ability to heat fuse to balloon materials. As will be appreciated by the skilled reader, however, other suitable materials or combinations thereof may be used. In some embodiments, the catheter body may be made of two parts. For example, in some embodiments, the catheter body may be made of a Pebax® core containing a plurality of lumens and a braided Pebax® exterior to reinforce the catheter body and give it sufficient rigidity (i.e., pushability) and flexibility (i.e., navigation) to advance through the anatomy.

The catheter hub 30, which will be described in more detail elsewhere herein, is configured to be attached from the proximal portion of the catheter body 22. As will be understood by the skilled reader, by providing a catheter hub 30 as disclosed herein that can be attached during a procedure, it is possible to provide a catheter body 22 that can be delivered into a human or animal body without a hub by way of the working channel of a GI endoscope. This not only allows for use of a GI endoscope for delivery of the catheter to the gastric outlet, but also allows the endoscope to be exchanged (i.e., removed from the body) while leaving the catheter body 22 in the body, and subsequently attaching the catheter hub 30 to the catheter body 22 for use of the catheter in a procedure. Gastrointestinal endoscopes are particularly advantageous for delivery of catheters due to their excellent maneuverability, visualization, and optimal stiffness.

The catheter hub 30 is also configured to provide fluid communication from the plurality of lumens in the catheter body 22 to a corresponding plurality of ports 31, 32 and 33 forming part of the catheter hub 30. As described in more detail elsewhere herein, the catheter body 22 can connect any number of ports to any number of lumens, depending on the configuration of the multi-lumen catheter. In some embodiments, the catheter hub 30 is injection molded and can be made of any suitable injectable polymer material including, but not limited to, acrylonitrile butadiene styrene (ABS), polycarbonate, polypropylene, polyvinyl chloride (PVC), polyether block amide (PEBA), or mixtures thereof. In some embodiments, the catheter hub 30 can be injection molded in several parts and assembled thereafter.

In some embodiments, the first balloon 21a and second balloon 21b can have a length of 32 mm to 50 mm and a height of 32 mm to 50 mm and may be made of any suitable material including, but not limited to, thermoplastic polyurethane, or latex substitute material. As will be appreciated, the first balloon 21a and the second balloon 21b can be of any required dimensions to occlude the small intestine and be made of any suitable material for procedures as described and referenced herein. The interior of each balloon is in fluid communication with a lumen of the catheter body 22.

In some embodiments, both occlusion balloons 21a, 21b are arranged to be in fluid communication with a single lumen within the catheter body 22. In other embodiments, each occlusion balloon 21a, 21b is arranged to be in fluid communication with a separate and distinct lumen within the catheter body 22. Embodiments in which each balloon can be inflated independently are particularly advantageous in situations in which catheter fails to reach the optimal location to occlude the small intestine at both ends to isolate and distend the enterostomy location. In such situations, the distal balloon 21b can be inflated on its own and infusion of fluid performed distal or proximal to the balloon. This allows for some distention of the small bowel and helps localize the enterostomy site despite failing to place the catheter at the ideal location.

At least one of the lumens forming part of the catheter body 22 provides fluid communication from one port 32 of the catheter hub 30 to at least one infusion port 23 situated at some point between the first occlusion balloon 21a and the second occlusion balloon 21b. In some embodiments, the catheter 20 as described herein can also provide infusion ports proximally and or distally to occlusion balloons 21a, 21b.

Figure 4:
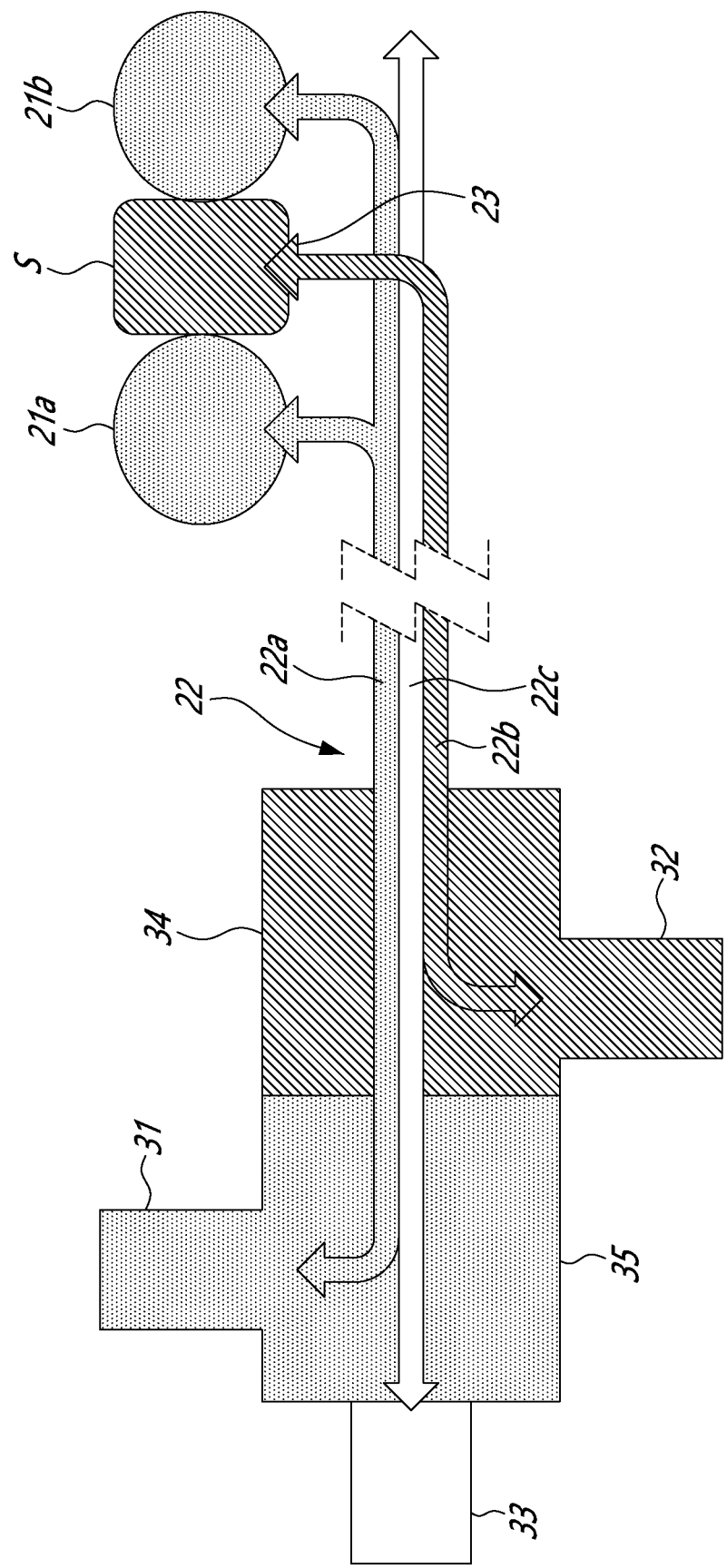
FIG. 4 shows a functional diagram of a catheter in accordance with embodiments of the present disclosure.

FIG. 4 shows a functional diagram of a device in accordance with embodiments of the present disclosure. As shown on FIG. 4, the catheter body 22 comprises a first catheter lumen 22a. In some embodiments, a first catheter lumen 22a is configured to provide fluid communication from a chamber 35 to the first occlusion balloon 21a and the second occlusion balloon 21b. Chamber 35 is itself in fluid communication with port 31. In some embodiments, a second catheter lumen 22b is configured to provide fluid communication from a chamber 34 to an infusion port 23 to operatively fill or partially fill the space S between the first occlusion balloon 21a and the second occlusion balloon 21b. Chamber 34 is itself in fluid communication with port 32. In some embodiments, a third catheter lumen 22c is configured to allow a guidewire (not shown) to be inserted into port 33 and threaded to a point extending beyond the catheter body 22, as shown in FIG. 4.

Figure 5:
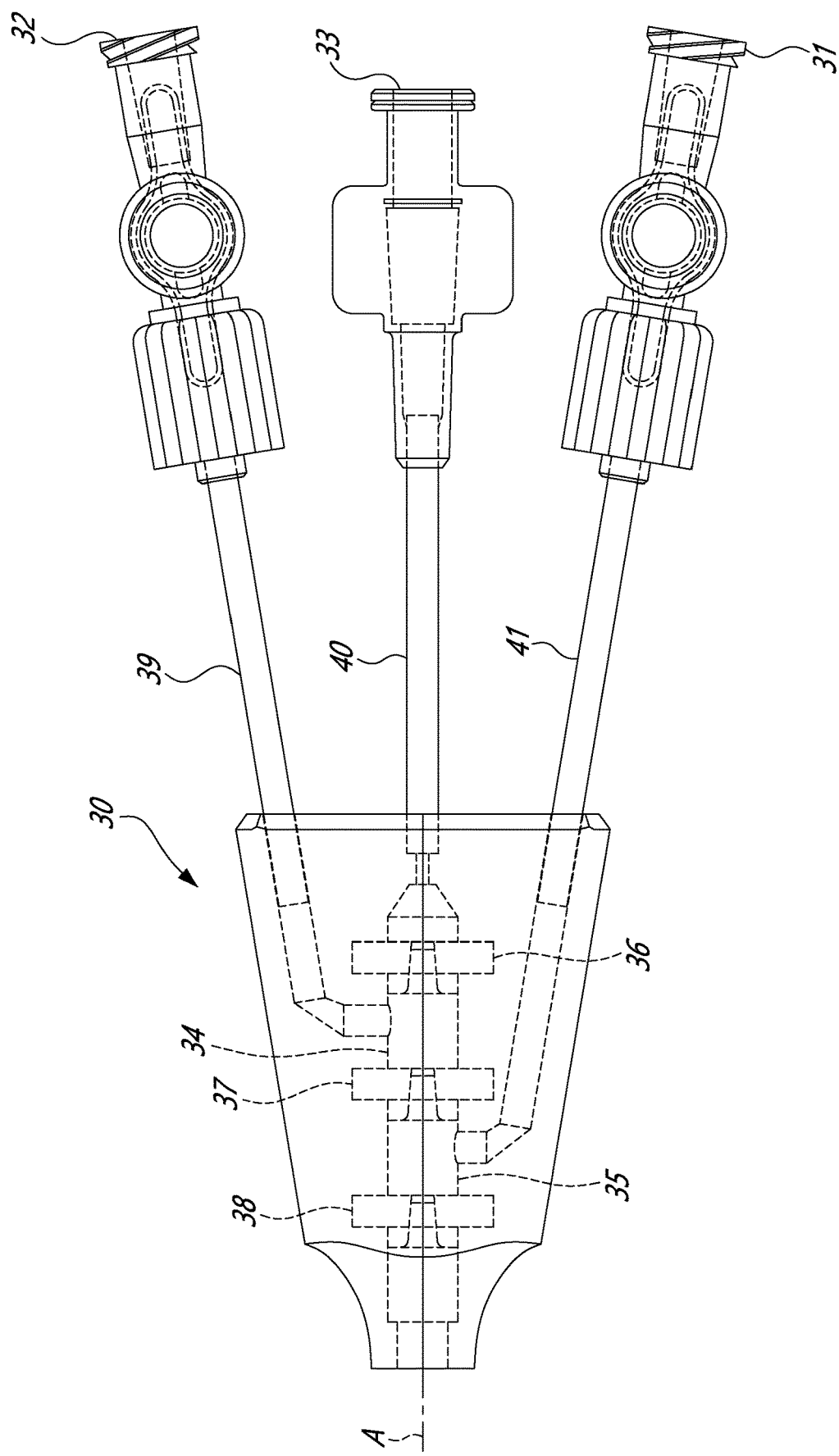
FIG. 5 shows the internal configuration of the ports and catheter hub of a catheter in accordance with embodiments of the present disclosure.

Now, with reference to FIGS. 5, 6A, 6B, 7A, 7B and 7C, a detachable catheter hub 30 in accordance with embodiments of the present disclosure will now be described in detail. In particular, FIG. 5 shows the internal configuration of the ports 31, 32, 33 and catheter hub 30 of a catheter 20 in accordance with embodiments of the present disclosure. FIGS. 6A and 6B show the internal configuration of the catheter hub 30 of a catheter 20 in accordance with embodiments of the present disclosure. FIGS. 7A to 7C show various side views of the ports 31, 32, 33 and catheter hub 30 of a catheter 20 in accordance with embodiments of the present disclosure.

FIG. 5 shows the catheter hub 30 without the proximal end of the catheter body 22 attached thereto. The catheter hub 30 comprises chamber 34, which is defined by interior side walls of the catheter hub 30 and seals 36 and 37. Similarly, chamber 35 is defined by the interior side walls of the catheter hub and seals 37, 38. Seals 36, 37 and 38 may be made of elastic material, such as latex, silicone (including gel-filled and/or intact-gel silicone structures), soft acrylic polymer or any other material or structure suitable to seal chambers 34, 35, and to allow for the proximal end of the catheter body to be inserted therethrough. In some embodiments, seals 36, 37, 38 are made of silicone 40A because of its biocompatibility as well as relatively high tear and tensile strength and flexibility. In other embodiments, other suitable materials may be used.

In some embodiments, seals 36, 37, 38 are cylindrically shaped seals disposed along the insertion axis A of the catheter hub 30. Each seal 36, 37, 38 includes a central opening O arranged to receive a portion of the proximal end of the catheter body 22 when inserted along the insertion axis A of the catheter hub 30, as shown in FIG. 6B. In some embodiments, each central opening O of each seal 36, 37, 38 is of a generally frustoconical shape having a wide end and a narrow end, thereby allowing the catheter body to easily be received by the wide end and, once pushed through the seal 36, 37, 38, having the narrow end provide centripetal force on the outer walls of the catheter body 22, thus providing a seal therewith. Each central opening O of seal 36, 37, 38 is arranged to create a substantially fluid-tight seal around the circumference of catheter body 22 once inserted therethrough. As such, in some embodiments, it may be necessary to apply pressure to the catheter body 22 along the insertion axis A of catheter hub 30 in order to push the catheter body 22 through central openings O of each seal 36, 37, 38. In some embodiments, seals 36, 37, 38 are stasis valves. In some embodiments, seals 36, 37, 38 are silicone stasis valves.

In some embodiments, other types of seals may be used including, but not limited to, duckbill seals, umbrella seals, flapper seals, membranes, diaphragms, and cross slits.

Chamber 34 is fluidly connected to port 32 by way of lumen 39. Similarly, chamber 35 is fluidly connected to port 31 by way of lumen 41. Once fully inserted into catheter hub 30, lumen 22c of catheter body 22 is configured to connect to lumen 40. Lumen 22c is connectable to lumen 40 so as to allow a guidewire to be inserted into port 33, through lumen 40 and into lumen 22c of catheter body 22. It will be understood by the skilled reader that the particular disposition of the chambers and lumens 39, 40, 41 need not be as shown in FIG. 5. Other embodiments may include one or more different configurations for fluidly connecting chambers 34, 35 to ports 31, 32.

As shown in FIGS. 6B and 7C, each of which shows catheter body 22 fully inserted into catheter hub 30 along insertion axis A. As will be appreciated, the catheter hub 30 can be attached to the catheter body 22 by fully inserting a proximal end of the catheter body 22 into the catheter hub 30. Similarly, the catheter hub 30 can be detached from the catheter body 22 by removing the proximal end of the catheter body 22 from the catheter hub 30. As can be seen from FIGS. 6B and 7C, lumen 22a and 22b include lumen openings 44 and 43, respectively. Lumen openings allow fluid communication between the interior and the exterior of a lumen. Opening 43 is located along the proximal end of catheter body 22 such that, when catheter body 22 is fully inserted into catheter hub 30 along insertion axis A, opening 43 is located inside chamber 35, thereby allowing for fluid communication between the interior of chamber 35 and the interior of lumen 22a. Similarly, opening 44 is located along the proximal end of catheter body 22 such that, when catheter body 22 is fully inserted into catheter hub 30 along insertion axis A, opening 44 is located inside chamber 34, thereby allowing for fluid communication between the interior of chamber 34 and the interior of lumen 22c.

FIG. 8 shows a side view of a hub and catheter body introducer in accordance with embodiments of the present disclosure. In some embodiments of the present disclosure, and for some particular applications, it may be desirable to have a very narrow and/or flexible catheter body 22. In such instances, it may be difficult to fully insert the catheter body 22 into the catheter hub 30 because of the mechanical resistance provided by seals 36, 37, 38. In such embodiments, an introducer 80 may be used together with a catheter as disclosed herein. In some embodiments, the introducer can include a hollow rigid shaft or sheath portion 80c which is operable to be inserted into the catheter hub 30 along the insertion axis A. The shaft portion 80c is open on either end and is rigid enough to easily be inserted through seals 36, 37, 38.

Once inserted, as shown in FIG. 8, an elongate catheter body 22 can be received by the wide cylindrical receiving section 80a and then guided to the interior of the shaft portion 80c by flared section 80b. Once the elongate catheter body 22 is fully inserted into the catheter hub 30, the introducer 80 can be removed from the catheter hub 30 and guided over the length of the catheter body 22 before being removed therefrom at the distal end of the catheter body 22. Removal of the introducer 80 allows the seals to seal against the catheter body 22 inside the catheter hub 30.

FIGS. 9A and 9B show different cross-sectional views of the catheter body in accordance with different embodiments of the present disclosure. As shown in FIG. 9A, in some embodiments, the elongate catheter body 22 can comprise a plurality of lumens 22a, 22b, 22c that are circular in cross-section. As shown in FIG. 9B, in some embodiments, the elongate catheter body 22 can comprise a central lumens 22c of a particular diameter and a plurality of crescent-shaped lumen 22a and 22b defined by inner and outer diameters. As described in more detail elsewhere herein, the elongate catheter body 22 described herein can comprise any number of lumens. As will be appreciated by the skilled reader, catheter body 22 in accordance with the present disclosure may comprise any number of lumens have any suitable configuration in cross section.

The lumens forming part of the same catheter body may vary in cross-sectional size. For example, in embodiments in which the catheter body comprises two inflation lumens in order to allow for independent inflation of each balloon 21a, 21b (such as described herein with reference to the embodiments shown in FIGS. 12 to 15), the lumens may vary in size in cross section. For example, in preferred embodiments, the lumens used to inflate balloons 21a, 21b, are smaller in cross sectional size that the other lumens of the catheter body in order to optimally use the space available inside the catheter body.

FIGS. 7B, 7C, 8, 10A and 10B show a securing mechanism that can form part of a catheter 20 in accordance with embodiments of the present disclosure. In some embodiments, it may be desirable to provide a securing mechanism 100, 101 between the elongate catheter body 22 and the catheter hub 30 to prevent the elongate catheter body 22 from slipping back out through seals 36, 37, 38 in use. In some embodiments, the securing mechanism may also align the lumen openings 43, 44 on the elongate catheter body 22 with the chambers 34, 35 of the catheter hub 30. In some embodiments, the snap fit of the securing mechanism 100, 101 can provide auditory and haptic feedback to a user, allowing the user to determine when the catheter body 22 is fully inserted into the catheter hub 30.

In some embodiments, the securing mechanism 100, 101 can be provided by an annular flange or rib 100 forming part of or located on the elongate catheter body 22 and associated annular groove 101 forming part of the catheter hub 30. In other embodiments, the securing mechanism 100, 101 can be provided by an O-ring forming part of or located on the elongate catheter body 22 and associated annular groove 101 forming part of the catheter hub 30. Once the elongate catheter body 22 is fully inserted into the catheter hub 30, as shown in FIGS. 7C and 10B, the annular flange or rib 100 is snapped into the annular groove 101, thereby providing increased mechanical resistance in both directions along the axis of insertion. In other embodiments, the securing mechanism can be any suitable rigid projection that mates with a corresponding recess in the catheter hub 30.

FIG. 11 shows a flow chart of the method steps involved in an endoscopic ultrasound guided balloon-occluded gastrojejunostomy bypass procedure 1100 using a catheter 20 in accordance with embodiments of the present disclosure. At step 1101, a user navigates the GI endoscope through the esophagus and stomach 10 to the gastric outlet. At step 1102, the user advances the guidewire through the working channel of a GI endoscope past the GOO 12 and past the target enterostomy site. Then, at step 1103, the user loads the catheter body 22 onto the back end of the guidewire. At step 1104, the user advances the catheter body 22 over the guidewire until the first and second occlusion balloons 21a, 21b are positioned on either side of the location for enterostomy stent placement site.

Then, at step 1105, the user removes the endoscope 25 via exchange (over the catheter body 22) while leaving the catheter body 22 in the patient's body. This step is only possible because the catheter body 22 is attachable to the catheter hub 30, and the entirety of the catheter body 22 is thin enough to be fed through the working channel of the endoscope 25 prior to attachment to the catheter hub 30. It would therefore not be possible to accomplish this step with prior art catheters.

At step 1106, the user feeds the proximal end of the guidewire through the catheter hub 30 opening. At step 1107, the user then attaches the catheter body 22 the catheter hub 30. As described elsewhere herein, attaching the catheter body 22 to the catheter hub 30 can include fully inserting a portion of the proximal end of the catheter body 22 into the catheter hub 30. At step 1108, the user can then inflate the occlusion balloons 21a, 21b though port 31. Then, at step 1109 the user can infuse the intestinal space between the occlusion balloons 21a, 21b to distend the small intestine.

At step 1110, the user advances the echoendoscope to the stomach to identify the distended and occluded segment of the small intestine. At step 1111, the user performs a gastroenterostomy/gastrojejunostomy procedure and deploys the LAMS 24. Finally, at step 1112, the user deflates occlusion balloons 21a, 21b and removes catheter body 22 and the guidewire from the patient's body.

FIG. 12 shows a view of a catheter hub 130 of a catheter in accordance with alternative embodiments of the present disclosure. The catheter hub 130 includes a plurality of ports 131, 132, 133, 134 in fluid communication with a lumen 163, 162, 161, 160, respectively.

It will be understood by the skilled reader that the catheter hub 130 may be connected to and cooperate with catheter bodies similar to those described with respect to previous embodiments, as described in more detail elsewhere herein. In particular, the catheter hub 130 is configured to be attached from the proximal portion of the catheter body and configured to provide fluid communication from the plurality of lumens in the catheter body to the corresponding plurality of ports 131, 132, 133 and 134 forming part of the catheter hub 130.

As can be seen from FIG. 12, the catheter hub 130 may comprise four ports 131, 132, 133, 134, each of which is in fluid communication with a lumen opening of a corresponding catheter body. As such, in accordance with the embodiment of FIG. 12, two ports can be used to inflate the balloons, thereby allowing for independent inflation of each balloon.

Similarly to previously described embodiments, by providing a catheter hub 130 as disclosed herein that can be attached during a procedure, it is possible to provide a catheter body that can be delivered into a human or animal body without a hub by way of the working channel of a GI endoscope.

In some embodiments, the catheter hub 130 is injection molded and can be made of any suitable injectable polymer material including, but not limited to, acrylonitrile butadiene styrene (ABS), polycarbonate, polypropylene, polyvinyl chloride (PVC), polyether block amide (PEBA), or mixtures thereof. In some embodiments, the catheter hub 130 can be injection molded in several parts and assembled thereafter.

FIG. 13 shows a cross-sectional view of the internal configuration of the catheter hub 130 of a catheter in accordance with alternative embodiments of the present disclosure. FIG. 14 shows an exploded perspective view of the internal configuration of the catheter hub 130 of the catheter of FIG. 13.

FIGS. 13 and 14 show the catheter hub 130 without the proximal end of the catheter body attached thereto. The skilled reader will understand that the technical principles of how catheter hub 30 attaches to catheter body 22 will apply mutatis mutandis to how catheter hub 130 attaches to a similar catheter body.

The catheter hub 130 comprises chamber 140, which includes a cage structure being generally cylindrical in shape and having two or more radially extending fins separating the ends of the cylinder and surrounding a central cavity. In other embodiments, the fins can be replaced by columns, or shapes and/or structure, that provide space between the two ends of the generally cylindrical cage structure. Each end of the cage structure has a hole for receiving the proximal end of the catheter body. The cage structures can be made of any suitable material such as rigid or semi-rigid polymers and/or metals. In preferred embodiments, the cage structures are rigid in the axial direction in order to withstand compressive loads and do not deform in order to cause compression of the seals 150, 151, 152, 153 inside the catheter hub 130. The cage structures can be 3D printed using BioMed Clear Resin™. In other embodiments, however, the cage structures may be made of any rigid plastic material including, but not limited to, injection molding with acrylonitrile, butadiene, and styrene (ABS), polycarbonate (PC), etc.

Chambers 140, 141, 142, 143 comprise cage structures longitudinally extending along the insertion axis from a top end to a bottom end. The top and bottom ends are separated by structures allowing the elongate catheter body to be received through the top and bottom ends and allowing fluid to flow through the volume created by the cage structure.

As will be appreciated by the skilled reader, other cage structures are also possible, provided that they define chambers with a substantially rigid structure of a fixed height along insertion axis A and allow fluid to flow around the interior of each chamber and into a corresponding lumen, thereby fluidly connecting the center of the chamber to a corresponding lumen in catheter hub 130. Similarly, chambers 141, 142 and 143, which are in fluid communication with lumens 162, 163 and 160, respectively, are constructed in the same way, using cage structures.

Between chambers 140, 141, 142, 143 are seals 150, 151, 152, 153, which may be made of elastic material, such as latex, silicone (including gel-filled and/or intact-gel silicone structures), soft acrylic polymer or any other material or structure suitable to seal chambers 140, 141, 142, 143 and to allow for the proximal end of the catheter body to be inserted therethrough. In some embodiments, seals 150, 151, 152, 153 are made of silicone because of its biocompatibility as well as relatively high tear and tensile strength and flexibility. In other embodiments, other suitable materials may be used.

In some embodiments, seals 150, 151, 152, 153 are cylindrically shaped seals disposed along the insertion axis A of the catheter hub 130, as shown in FIGS. 13 and 14. Each seal 150, 151, 152, 153 includes a central opening arranged to receive a portion of the proximal end of the catheter body when inserted along the insertion axis A of the catheter hub 130, as shown in FIGS. 13 and 14.

In some embodiments, each central opening of each seal 150, 151, 152, 153 is tapered towards the center of the seal, having two wide upper and lower ends and a narrower center portion, thereby allowing the catheter body to easily be received by the wide end and, once pushed through the seal 150, 151, 152, 153 having the narrow centers provide centripetal force on the outer walls of the catheter body, thus providing a seal therewith. Each central opening of seal 150, 151, 152, 153 is arranged to create a substantially fluid-tight seal around the circumference of catheter body once inserted therethrough. As such, in some embodiments, it may be necessary to apply pressure to the catheter body along the insertion axis A of catheter hub 130 in order to push the catheter body through central openings of each seal 150, 151, 152, 153.

In some embodiments, catheter hub 130 comprises push plug 154 for securing the chambers 140, 141, 142, 143 and seals 150, 151, 152, 153 inside the catheter hub 130. In some embodiments, when fully inserted, push plug 154 also provides constant pressure along insertion axis A towards the center of catheter hub 130. Push plug 154 may be made suitable material such as rigid or semi-rigid polymers and/or metals. In preferred embodiments, the push plug 154 is rigid in the axial direction in order to withstand compressive loads and does not deform in order to contribute to compression of the seals 150, 151, 152, 153 inside the catheter hub 130.

In other words, the push plug provides a compressive load to the sequence of cage structures and seals, in order to compress the seals pushing them outwards to seal against the central cavity. As such, the cage structures and push plug need to withstand compressive load and not deform—i.e., to cause the seals to deform instead. The push plug 154 can be 3D printed using BioMed Clear Resin™. In other embodiments, however, the push plug 154 may be made of any rigid plastic material including, but not limited to, injection molding with acrylonitrile, butadiene, and styrene (ABS), polycarbonate (PC), etc.

As will be appreciated by the skilled reader, because of the rigidity provided by the cage structures of chambers 140, 141, 142, 143, any mechanical pressure caused by insertion of the catheter body and/or push plug 154 along insertion axis A will be transferred to resilient seals 150, 151, 152, 153, which will cause seals 150, 151, 152, 153 to deform outwardly (away from insertion axis A) and inwardly (toward insertion axis A). Such deformation will further increase pressure on the inner sidewalls of the catheter hub 130 and the outer sidewalls of the catheter body, thereby increase the effectiveness of the seals.

In some embodiments, other types of seals may be used including, but not limited to, duckbill seals, umbrella seals, flapper seals, membranes, diaphragms, and cross slits.

Catheter hub 130 can be attached to the catheter body (not shown) by fully inserting a proximal end of the catheter body into the catheter hub 130. Similarly, catheter hub 130 can be detached from the catheter body by removing the proximal end of the catheter body from the catheter hub 130. It will be understood by the skilled reader that, once the catheter body is fully inserted into catheter hub 130, chamber 140 provides for fluid communication between lumen 161 and a corresponding lumen in the catheter body (not shown), chamber 141 provides for fluid communication between lumen 162 and a corresponding lumen in the catheter body (not shown), chamber 142 provides for fluid communication between lumen 163 and a corresponding lumen in the catheter body (not shown), and chamber 143 provides for fluid communication between lumen 160 and a corresponding lumen in the catheter body (not shown).

Thus, by providing an elongate catheter body 22 having a number of longitudinally disposed openings and providing a catheter hub 130 arranged to receive the elongate catheter body 22 along an insertion axis and including a corresponding number of chambers longitudinally disposed along an insertion axis, it is possible to provide a catheter having a detachable hub and a catheter body being very narrow along its entire length. As will be appreciated by the skilled reader, such a narrow catheter body is suitable to be threaded through the working channel of an endoscope, as described in more detail elsewhere herein.

FIG. 15 shows a view of a catheter hub 230 of a catheter in accordance with other alternative embodiments of the present disclosure. The catheter hub 230 includes a plurality of ports (not shown) in fluid communication with a lumen 263, 262, 261, 260, respectively.

It will be understood by the skilled reader that the catheter hub 230 may be connected to and cooperate with the catheter bodies of previously embodiments, as described in more detail elsewhere herein. In particular, the catheter hub 230 is configured to be attached from the proximal portion of the catheter body and configured to provide fluid communication from the plurality of lumens in the catheter body to the corresponding lumens forming part of the catheter hub 130.

Similarly to previously described embodiments, by providing a catheter hub 230 as disclosed herein that can be attached during a procedure, it is possible to provide a catheter body that can be delivered into a human or animal body without a hub by way of the working channel of a GI endoscope.

In some embodiments, the catheter hub 230 is injection molded and can be made of any suitable injectable polymer material including, but not limited to, acrylonitrile butadiene styrene (ABS), polycarbonate, polypropylene, polyvinyl chloride (PVC), polyether block amide (PEBA), or mixtures thereof. In some embodiments, the catheter hub 230 can be injection molded in several parts and assembled thereafter.

FIG. 15 shows an exploded perspective view of the internal configuration of the catheter hub 230 without the proximal end of the catheter body attached thereto. The skilled reader will understand that the technical principles of how catheter hub 30 attaches to catheter body 22 will apply mutatis mutandis to how catheter hub 230 attaches to a similar catheter body.

The catheter hub 130 comprises a monolithic insert 200 formed of a molded material. Insert 200 comprises chambers 241, 242, 243, which are defined by the inner side walls of the longitudinally extending central cavity of insert 200.

Between chambers 241, 242, 243 are pinch points 251, 252, 253, which may be narrower sections in the central cavity.

The insert may be made of elastic material, such as latex, silicone (including gel-filled and/or intact-gel silicone structures), soft acrylic polymer or any other material or structure suitable to seal chambers 241, 242, 243 and to allow for the proximal end of the catheter body to be inserted therethrough. In some embodiments, insert 200 is made of silicone because of its biocompatibility as well as relatively high tear and tensile strength and flexibility. In other embodiments, other suitable materials may be used.

In some embodiments, pinch points 251, 252, 253 act as cylindrically shaped seals disposed along the insertion axis A of the catheter hub 230, as shown in FIG. 15. Each pinch point 251, 252, 253 includes a central opening arranged to receive a portion of the proximal end of the catheter body when inserted along the insertion axis A of the catheter hub 230, as shown in FIG. 15.

Each pinch point 251, 252, 253 is arranged to create a substantially fluid-tight seal around the circumference of catheter body once inserted therethrough.

Catheter hub 230 can be attached to the catheter body (not shown) by fully inserting a proximal end of the catheter body into the catheter hub 230. Similarly, catheter hub 230 can be detached from the catheter body by removing the proximal end of the catheter body from the catheter hub 230. It will be understood by the skilled reader that, once the catheter body is fully inserted into catheter hub 230, chamber 241 provides for fluid communication between lumen 262 and a corresponding lumen in the catheter body (not shown), chamber 242 provides for fluid communication between lumen 263 and a corresponding lumen in the catheter body (not shown), and chamber 243 provides for fluid communication between lumen 260 and a corresponding lumen in the catheter body (not shown).

As will be appreciated by the skilled reader, having understood the above embodiments, by providing an elongate catheter body 22 having a number of longitudinally disposed openings and providing a catheter hub 30, 130, 230, arranged to receive the elongate catheter body along an insertion axis and including a corresponding number of chambers longitudinally disposed along an insertion axis, it is possible to provide a catheter having a detachable hub and a catheter body being very narrow along its entire length. As will also be appreciated by the skilled reader, such a narrow catheter body is suitable to be threaded through the working channel of an endoscope, as described in more detail elsewhere herein.

Another significant advantage of the double-balloon catheter described herein is that the catheter hub 30 comprises a plurality of chambers longitudinally disposed along an insertion axis, each chamber communicating with an opening in a lumen of the catheter body 22. Because the proximal end of the catheter body 22 is directly inserted into the catheter hub 30 along the insertion axis, each fluid connection between a lumen of the catheter body 22 and a chamber of the catheter hub 30 can be provided by a simple opening in the side wall of the lumen. As such, there is no need to provide a connector between the catheter body 22 and the catheter hub 30, which connector would typically be wider in diameter than the catheter body 22. Requiring such a connector would limit the size of the catheter body 22 (and thus the number of lumens) to the number of lumens being connectable to the catheter hub 30 using the connector. Instead, in accordance with a catheter as disclosed herein, the only limitation regarding the number of lumens lies with the overall diameter of the catheter body 22, which in some embodiments must fit through the working channel of the GI endoscope.

Moreover, if using a liquid for balloon inflation, such as water or saline, the inflation lumen(s) must be large enough to facilitate the infusion of the liquid over the entire working length of the catheter. If instead a gas (e.g., air), is used for balloon inflation, the inflation lumen(s) can significantly be reduced in size due to the lower resistance of gas vs. liquid. Therefore, by using a gaseous inflation fluid in accordance with a catheter as described herein, a relatively large number of lumens can be provided within the catheter body 22. Another advantage of having inflation lumen(s) of decreased size is that it allows the infusion lumen to be larger, while maintaining a catheter body 22 diameter that can fit through the working channel of a gastrointestinal endoscope. A larger infusion lumen allows for easier and faster infusion of a saline solution for distention.

Various embodiments have been described herein by way of example only. Various modifications and variations may be made to these example embodiments without departing from the scope of the appended claims. For example, a catheter in accordance with the present disclosure may comprise any number of lumens. Also, the skilled reader will understand that the features of FIGS. 8, 9A, 9B, 10A, 10B can also be readily combined with the embodiments described with reference to FIGS. 12, 13, 14 and 15.

Moreover, a catheter in accordance with the present disclosure may comprise any number of lumens for inflating any number of occlusion balloons with any fluid suitable therefore. Furthermore, a catheter in accordance with the present disclosure may comprise any number of lumens for infusing the space between any number of occlusion balloons with any fluid suitable therefore.

The invention claimed is:

1. A double-balloon catheter comprising:
an elongate catheter body including a plurality of lumens;
first and second inflatable occlusion balloons located proximate a distal end of the elongate catheter body, the first and second inflatable occlusion balloons being configured to receive fluid through at least one of the plurality of lumens;
an infusion port located proximate the distal end of the elongated catheter body, the infusion port being in fluid communication with another of the plurality of lumens and situated between the first inflatable occlusion balloon and the second inflatable occlusion balloon; and
a catheter hub comprising a plurality of entry ports, the catheter hub being arranged to be attachable to a proximal end of the elongate catheter body and to fluidly connect two or more of the plurality of lumens to associated one or more of the plurality of entry ports, wherein the entire length of the elongate catheter body is configured to pass through the working channel of a gastrointestinal endoscope.

2. The double-balloon catheter of claim 1, wherein the catheter hub is further arranged to be detachable from the proximal end of the elongate catheter body.

3. The double-balloon catheter of claim 1, wherein the cross-section of the portion of the elongate catheter body that is connected to the catheter hub is of substantially the same diameter as the rest of the elongate catheter body.

4. The double-balloon catheter of claim 1, wherein the first and second occlusion balloons are both fluidly connected to one of the two or more of the plurality of lumens.

5. The double-balloon catheter of claim 1, wherein the first and second occlusion balloons are each connected to separate one of the two or more of the plurality of lumens.

6. The double-balloon catheter of claim 1, further comprising:
a second infusion port located between the first and second occlusion balloons and the proximal end of elongate catheter body.

7. The double-balloon catheter of claim 1, further comprising:
a second infusion port located between the first and second occlusion balloons and the distal end of elongate catheter body.

8. The double-balloon catheter of claim 1 comprising a lumen suitable for advancing a guidewire therethrough.

9. The double-balloon catheter of claim 1, wherein the catheter hub is further arranged to receive a portion of the proximal end of the elongate catheter body.

10. The double-balloon catheter of claim 9, wherein the plurality of lumens each include lumen sidewalls and fluid communication between the plurality of lumens and the catheter hub is provided by openings in the lumen sidewalls of the two or more of the plurality of lumens.

11. The double-balloon catheter of claim 10, wherein the openings are disposed at different longitudinal locations along the length of the proximal end of the elongate catheter body.

12. The double-balloon catheter of claim 10, wherein the catheter hub is further arranged to receive a portion of the proximal end of the elongate catheter body along an insertion axis.

13. The double-balloon catheter of claim 12, wherein the catheter hub further comprises:
a plurality of chambers longitudinally disposed along the insertion axis, wherein each chamber is fluidly connected to an entry port, and wherein the plurality of lumens includes one or more lumens associated with each chamber,
wherein when the proximal end of the elongate catheter body is fully received into the catheter hub along the insertion axis, each of the one or more lumens is arranged such that its lumen opening is positioned inside its associated chamber.

14. The double-balloon catheter of claim 13, wherein the plurality of chambers are separated by seals configured to fluidly seal the chambers from one another when the elongate catheter body is received through the seals.

15. The double-balloon catheter of claim 14, wherein the seals are made of elastic material, such as latex, silicone, including gel-filled and/or intact-gel silicone structures or soft acrylic polymer.

16. The double-balloon catheter of claim 13, wherein each chamber comprises a cage structure longitudinally extending along the insertion axis from a top end to a bottom end, wherein the top and bottom ends are separated by at least one structure allowing the elongate catheter body to be received through the top and bottom ends and allowing fluid to flow through the volume created by the cage structure.

17. The double-balloon catheter of claim 13, wherein the chambers and seals are made of a monolithic piece of molded material.

18. The double-balloon catheter of claim 1, wherein the first inflatable occlusion balloon and the second inflatable occlusion balloon have a length of 32 mm to 50 mm and a height of 32 mm to 50 mm.

19. The double-balloon catheter of claim 1, wherein at least one of the plurality of lumens is configured to carry gas therethrough.

20. The double-balloon catheter of claim 1, further comprising:
a securing mechanism configured to secure the proximal end of the elongate catheter body in place when fully inserted into the catheter hub.

21. The double-balloon catheter of claim 20, wherein the securing mechanism comprises an annular flange or rib formed around a portion of the proximal end of the elongate catheter body and configured to be inserted into a corresponding recess in the catheter hub.

22. The double-balloon catheter of claim 1, further comprising a disposable sheath configured to facilitate insertion of the proximal end of the elongate catheter body through the seals.

* * * * *